US008360844B2

(12) United States Patent
Schwartz et al.

(10) Patent No.: US 8,360,844 B2
(45) Date of Patent: Jan. 29, 2013

(54) MULTIPLE WAGER, MULTIPLE POTENTIAL WINNING OUTCOME GAMING PLATFORM

(76) Inventors: Marc B Schwartz, Longwood, FL (US); Gloria F. Mitchell, Longwood, FL (US)

( * ) Notice: Subject to any disclaimer, the term of this patent is extended or adjusted under 35 U.S.C. 154(b) by 22 days.

(21) Appl. No.: 13/045,120

(22) Filed: Mar. 10, 2011

(65) Prior Publication Data

US 2011/0223983 A1 Sep. 15, 2011

Related U.S. Application Data

(60) Provisional application No. 61/340,114, filed on Mar. 13, 2010.

(51) Int. Cl.
*G06F 17/00* (2006.01)

(52) U.S. Cl. ........................................................ 463/17

(58) Field of Classification Search .............. 463/16–25, 463/30
See application file for complete search history.

(56) References Cited

U.S. PATENT DOCUMENTS 5,904,779 A * 5/1999 Dhindsa et al. ........... 118/723 E
6,620,047 B1 9/2003 Alcorn et al.
7,862,427 B2 * 1/2011 Nguyen et al. .................. 463/27
8,021,230 B2 * 9/2011 Baerlocher et al. ............. 463/25
8,052,519 B2 * 11/2011 Soltys ............................ 463/25
2005/0282608 A1 12/2005 O'Halloran
2007/0191090 A1 8/2007 O'Halloran et al.

* cited by examiner

*Primary Examiner* — Ronald Laneau
(74) *Attorney, Agent, or Firm* — Mark A. Litman & Associates, P.A.

(57) ABSTRACT

A multiple wager, multiple potential winning outcome gaming "Spin Game" platform may be played in its native configuration as well as easily themed to allow variations and adaptations including but not limited to casino table games, sporting teams and events, entertainment, film, television, and celebrities, as well as various other pop-culture fashions and trends. Specific deployments may be used to aid in transitioning "slots only" (or other EGM exclusive) players to active participants in table games by providing a step-by-step confidence building path from individual standalone, to multi-player "Party Style" deployments of the "Spin Game", and finally to the actual table games themselves. Countdown timers may be configured to encourage and even reward players to place their wagers before the timer reaches zero—when "No More Bets" is called and the "Game Wheel" is spun, thereby ensuring that casino "hands per minute" target goal requirements are met or exceeded.

13 Claims, 4 Drawing Sheets

FIG 2

| | WAGER | RED | WHITE | BLUE | GREEN | SILVER | GOLD |
|---|---|---|---|---|---|---|---|
| To Win Channel Must Contain | | 3 or more | 3 or more | 2 or more | 2 or more | 1 or more | 1 or more |
| Individual Channel Wagers | Channel C | | | | | | |
| | Channel A | | | | | | |
| | Channel R | | | | | | |
| | Channel O | | | | | | |
| | Channel U | | | | | | |
| | Channel S | | | | | | |
| | Channel E | | | | | | |
| | Channel L | | | | | | |
| To Win Ring Must Contain | | 5 or more | 4 or more | 4 or more | 3 or more | 2 or more | 1 or more |
| Individual Ring Wagers | Ring I | | | | | | |
| | Ring II | | | | | | |
| | Ring III | | | | | | |
| | Ring IV | | | | | | |
| To Win Channels Must Contain | | 5 or more | 4 or more | 4 or more | 3 or more | 2 or more | 1 or more |
| Popular Two Channel Wagers | Channels C & A | | | | | | |
| | Channels A & R | | | | | | |
| | Channels R & O | | | | | | |
| | Channels O & U | | | | | | |
| | Channels U & S | | | | | | |
| | Channels S & E | | | | | | |
| | Channels E & L | | | | | | |
| | Channels L & C | | | | | | |
| Pick Two Channels | C A R O<br>U S E L | | | | | | |
| To Win Channels Must Contain | | 7 or more | 6 or more | 5 or more | 5 or more | 3 or more | 2 or more |
| Popular Three Channel Wagers | Channels C-A-R | | | | | | |
| | Channels A-R-O | | | | | | |
| | Channels R-O-U | | | | | | |
| | Channels O-U-S | | | | | | |
| | Channels U-S-E | | | | | | |
| | Channels S-E-L | | | | | | |
| | Channels E-L-C | | | | | | |
| | Channels L-C-A | | | | | | |
| Pick Three Channels | C A R O<br>U S E L | | | | | | |
| To Win Channels Must Contain | | 10 or more | 9 or more | 8 or more | 7 or more | ALL | ALL |
| Popular Four Channel Wagers | Channels C-A-R-S | | | | | | |
| | Channels R-A-C-E | | | | | | |
| | Channels R-O-S-E | | | | | | |
| | Channels S-O-U-L | | | | | | |
| | Channels A-O-U-E | | | | | | |
| | Channels C-R-S-L | | | | | | |
| Pick Four Channels | C A R O<br>U S E L | | | | | | |
| To Win Rings Must Contain | | 10 or more | 9 or more | 8 or more | 7 or more | ALL | ALL |
| Popular Two Ring Wagers | Rings I & II | | | | | | |
| | Rings I & III | | | | | | |
| | Rings I & IV | | | | | | |
| | Rings II & III | | | | | | |
| | Rings II & IV | | | | | | |
| | Rings III & IV | | | | | | |
| Pick Two Rings | I II III IV | | | | | | |
| To Win Center Must Contain | | 6 or more | 5 or more | 4 or more | 3 or more | 2 or more | 1 or more |
| Leftovers | Wheel Center | | | | | | |

FIG 3

○○○○ Channel C - 2+ BLUE - Bet 10 - Won ____

○○○○ Channel C and
○○○○ Channel A - 3+ GREEN - Bet 5 - Won ____

○○○○ Channel C and
○○○○ Channel A and
○○○○ Channel R - 7+ RED - Bet 10 - Won ____

○○○○ Channel C and
○○○○ Channel A and
○○○○ Channel R and
○○○○ Channel O - 9+ WHITE - Bet 5 - Won ____

○○○○○○○○ Ring I - 5+ RED - Bet 10 - Won ____
C A R O U S E L

○○○○○○○○ Ring II and
○○○○○○○○ Ring III - 8+ BLUE - Bet 5 - Won ____
C A R O U S E L ○○○○○○○○○○ Wheel Center - 5+ WHITE - Bet 5 - Won ____

| | WAGER | RED | WHITE | BLUE | GREEN | SILVER | GOLD |
|---|---|---|---|---|---|---|---|
| To Win Channel Must Contain | | 3 or more | 3 or more | 2 or more | 2 or more | 1 or more | 1 or more |
| Individual Channel Wagers | Channel C | Odds/Wager BET | Odds/Wager BET | Odds/Wager BET | Odds/Wager BET | Odds/Wager BET | Odds/Wager BET |
| | Channel A | Odds/Wager BET | Odds/Wager BET | Odds/Wager BET | Odds/Wager BET | Odds/Wager BET | Odds/Wager BET |
| | Channel R | Odds/Wager BET | Odds/Wager BET | Odds/Wager BET | Odds/Wager BET | Odds/Wager BET | Odds/Wager BET |
| | Channel O | Odds/Wager BET | Odds/Wager BET | Odds/Wager BET | Odds/Wager BET | Odds/Wager BET | Odds/Wager BET |
| | Channel U | Odds/Wager BET | Odds/Wager BET | Odds/Wager BET | Odds/Wager BET | Odds/Wager BET | Odds/Wager BET |
| | Channel S | Odds/Wager BET | Odds/Wager BET | Odds/Wager BET | Odds/Wager BET | Odds/Wager BET | Odds/Wager BET |
| | Channel E | Odds/Wager BET | Odds/Wager BET | Odds/Wager BET | Odds/Wager BET | Odds/Wager BET | Odds/Wager BET |
| | Channel L | Odds/Wager BET | Odds/Wager BET | Odds/Wager BET | Odds/Wager BET | Odds/Wager BET | Odds/Wager BET |
| To Win 1 Ring Must Contain | | 5 or more | 4 or more | 4 or more | 3 or more | 2 or more | 1 or more |
| Individual Ring Wagers | Ring I | | | | | | |
| | Ring II | | | | | | |
| | Ring III | | | | | | |
| | Ring IV | | | | | | |
| To Win 2 Channels Must Contain | | 6 or more | 4 or more | 4 or more | 3 or more | 2 or more | 1 or more |
| Pick Two Channels | C A R O<br>U S E L | | | | | | |
| To Win 3 Channels Must Contain | | 7 or more | 6 or more | 5 or more | 5 or more | 3 or more | 2 or more |
| Pick Three Channels | C A R O<br>U S E L | | | | | | |
| To Win 4 Channels Must Contain | | 10 or more | 9 or more | 8 or more | 7 or more | ALL | ALL |
| Pick Four Channels | C A R O<br>U S E L | | | | | | |
| To Win 2 Rings Must Contain | | 10 or more | 9 or more | 8 or more | 7 or more | ALL | ALL |
| Pick Two Rings | I II III IV | | | | | | |
| To Win Center Must Contain | | 6 or more | 5 or more | 4 or more | 3 or more | 2 or more | 1 or more |
| Leftovers | Wheel Center | | | | | | |

MULTIPLE WAGER, MULTIPLE POTENTIAL WINNING OUTCOME GAMING PLATFORM

RELATED APPLICATION DATA

This application claims priority from U.S. Provisional Application Ser. No. 61/340,114 filed Mar. 13, 2010.

BACKGROUND OF THE INVENTION

1. Field of the Invention

The present invention relates generally to electronic casino games and more specifically it relates to a multiple wager, multiple potential winning outcome gaming platform for creating a new style of Electronic Gaming Machine (EGM) that delivers a more thrilling and entertaining gaming experience by providing players with multiple wagering opportunities on multiple potential winning outcomes through a gaming platform that is deployable in both stand-alone and "Party Style" multi-player configurations such as the Shuffle Master, Inc. Table Master™ gaming system. The resulting "Spin Game" platform may be played in its native configuration as well as easily themed to allow variations including but not limited to casino table games, sporting teams and events, entertainment, film, television, and celebrities, as well as various other pop-culture fashions and trends. Specific deployments may be used to aid in transitioning "slots only" players to active participants in table games by providing a step-by-step confidence building path from standalone to multi-player platform "Spin Game" deployments, and finally to the actual table games. Countdown timers may be configured to encourage and even reward players to place their wagers before the timer reaches zero—when "No More Bets" is called—and the "Game Wheel" is spun, thereby ensuring that casino target goals of "hands per minute" are met or exceeded. The net result of this new gaming concept for players is that they can enjoy a fast-paced, high-energy gaming experience with a vast array of wagers from which to choose and play by themselves in a standalone configuration or as part of a group in "Party Style" where they may win and lose together or bet against one another. The net result of this new gaming concept for casinos is that they may enjoy greater overall returns from a gaming platform designed to generate multiple potential winning outcomes during each round of game play, which, based upon the quantity and value of players' wagers, may easily equate to numerous rounds of traditional game play on other EGMs and even table games.

2. Background of the Art

It can be appreciated that electronic casino games have been in use for years. Typically, electronic casino games are comprised of mechanical and video-based forms of casino Electronic Gaming Machines (EGMs) such as slot machines, video poker, and multi-line video slot machines as well as table-based casino games employing cards, dice, tiles, balls, etc. or other objects similarly marked for identification, which may be played by an individual or multiple players simultaneously. These table based electronic games may also have individual player terminals at which players enter wagers and receive credits, and on which additional help or rules may be provided to players on demand.

The main problem with conventional electronic casino games is that the majority of video-based casino Electronic Gaming Machines (EGMs) are merely a variation of two standard software gaming platforms—video poker and multi-line video slots. While there is a large variety of styles of each gaming platform, the game play is basically the same, wagering opportunities are typically limited to a single winning event, such as a winning video poker hand in video poker or a line payout in video slots. Both platforms have become stale over time. This has required game manufacturers to pay costly royalties to obtain licensed entertainer, movie, and game show themes in order to maintain player interest.

Another problem with conventional electronic casino games is that current video-based casino gaming technology typically offers players an individual gaming experience with only a few minor exceptions. Very few table-based casino games are available in an EGM format, and even fewer allow multiple players to play simultaneously. Wagering opportunities are typically limited to a single winning event such as a winning video poker hand in video poker or a line payout in video slots, unlike some table games which offer a multitude of wagering opportunities based on a variety of outcomes. Many casino patrons are often intimidated by table games, fearing the repercussions of not knowing how to play or making a mistake in front of other players. While casinos often offer classes on how to play many of their table games, inexperienced players often relegate themselves to only playing slot machines and video poker, due to the intimidation factor. Most casino games, including table games, base wagers on a single event such as a throw of the dice, the hand that is dealt, the tiles that are selected, etc. Short of playing multiple hands simultaneously in certain table games such as blackjack, there are currently no casino games that allow for multiple wagers to be placed on the outcome of multiple events during a single round of game play.

Another problem with conventional electronic casino games is that while most EGMs have been optimized for speed to increase the number of plays per minute, there is no means of ensuring that an optimal target number of plays per minute will be achieved. It is still up to the player to pull the handle, press the buttons, etc. to spin a slot machine or deal the next hand. There is no motivation for the player to act within a specific time frame.

While these devices may be suitable for the particular purpose to which they address, they are not as suitable for creating a new style of Electronic Gaming Machine (EGM) that delivers a more thrilling and entertaining gaming experience by providing players with multiple wagering opportunities on multiple potential winning outcomes through a gaming platform that is deployable in both standalone and "Party Style" multi-player configurations. The resulting "Spin Game" platform may be played in its native configuration as well as easily themed to allow variations including but not limited to casino table games, sporting teams and events, entertainment, film, television, and celebrities, as well as various other pop-culture fashions and trends. Specific deployments may be used to aid in transitioning "slots only" players to active participants in table games by providing a step-by-step confidence building path from standalone to "Party Style" "Spin Game" deployments, and finally to the actual table games. Countdown timers may be configured to encourage and even reward players to place their wagers before the timer reaches zero—when "No More Bets" is called—and the "Game Wheel" is spun, thereby ensuring that casino target goals of "hands per minute" are met or exceeded. The net result of this new gaming concept for players is that they can enjoy a fast-paced, high-energy gaming experience with a vast array of wagers from which to choose and play by themselves in a standalone configuration or as part of a group in "Party Style" where they may win and lose together or bet against one another. The net result of this new gaming concept for casinos is that they may enjoy greater overall returns from a gaming platform designed to generate multiple potential winning outcomes during each round of game play, which, based upon the quantity and value of players' wagers, may easily equate to numerous rounds of traditional game play on other EGMs and even table games.

The main problem with conventional electronic casino games are the majority of video-based casino Electronic Gaming Machines (EGMs) are merely variation of two standard software gaming platforms—video poker and multi-line video slots. While there are a large variety of styles of each gaming platform, the game play is always basically the same, wagering opportunities are typically limited to a single winning event, such as a winning video poker hand in video poker or a line payout in video slots, and both platforms have become stale over time, requiring game manufacturers to pay costly royalties to obtain licensed entertainer, movie, and game show themes in order to maintain player interest.

Another problem is that current video-based casino gaming technology typically offers players an individual gaming experience with only a few minor exceptions. Very few table-based casino games are available in an EGM format, and even fewer allow multiple players to play simultaneously. Wagering opportunities are typically limited to a single winning event such as a winning video poker hand in video poker or a line payout in video slots, unlike some table games which offer a multitude of wagering opportunities based on a variety of outcomes. Many casino patrons are often intimidated by table games, fearing the repercussions of not knowing how to play or making a mistake in front of other players. While casinos often offer classes on how to play many of their table games, inexperienced players often relegate themselves to only playing slot machines and video poker, due to the intimidation factor. Most casino games, including table games, base wagers on a single event such as a throw of the dice, the hand that is dealt, the tiles that are selected, etc. Short of playing multiple hands simultaneously in certain table games such as blackjack, there are currently no casino games that allow for multiple wagers to be placed on the outcome of multiple events during a single round of game play.

Also, another problem is that while most EGMs have been optimized for speed to increase the number of plays per minute, there is no means of ensuring that an optimal target number of plays per minute will be achieved. It is still up to the player to pull the handle, press the buttons, etc. to spin a slot machine or deal the next hand. There is no motivation for the player to act within a specific time frame.

In these respects, the multiple wager, multiple potential winning outcome gaming platform according to the present invention substantially departs from the conventional concepts and designs of the prior art, and in so doing provides an apparatus primarily developed for the purpose of creating a new style of Electronic Gaming Machine (EGM) that delivers a more thrilling and entertaining gaming experience by providing players with multiple wagering opportunities on multiple potential winning outcomes through a gaming platform that is deployable in both standalone and "Party Style" multi-player configurations. The resulting "Spin Game" platform may be played in its native configuration as well as easily themed to allow variations including but not limited to casino table games, sporting teams and events, entertainment, film, television, and celebrities, as well as various other pop-culture fashions and trends. Specific deployments may be used to aid in transitioning "slots only" players to active participants in table games by providing a step-by-step confidence building path from standalone to "Party Style" "Spin Game" deployments, and finally to the actual table games. Countdown timers may be configured to encourage and even reward players to place their wagers before the timer reaches zero—when "No More Bets" is called—and the "Game Wheel" is spun, thereby ensuring that casino target goals of "hands per minute" are met or exceeded. The net result of this new gaming concept for players is that they can enjoy a fast-paced, high-energy gaming experience with a vast array of wagers from which to choose and play by themselves in a standalone configuration or as part of a group in "Party Style" where they may win and lose together or bet against one another. The net result of this new gaming concept for casinos is that they may enjoy greater overall returns from a gaming platform designed to generate multiple potential winning outcomes during each round of game play, which, based upon the quantity and value of players' wagers, may easily equate to numerous rounds of traditional game play on other EGMs and even table games.

SUMMARY OF THE INVENTION

The present invention provides a new multiple wager, multiple potential winning outcome gaming platform construction wherein the platform construction can be used for creating a new style of Electronic Gaming Machine (EGM) that delivers a more thrilling and entertaining gaming experience by providing players with multiple wagering opportunities on multiple potential winning outcomes through a gaming platform that is deployable in both standalone and "Party Style" multi-player configurations. The resulting "Spin Game" platform may be played in its native configuration as well as easily themed to allow variations including, but not limited to, casino table games, sporting teams and events, entertainment, film, television, and celebrities, as well as various other pop-culture fashions and trends. Specific deployments may be used to aid in transitioning "slots only" players to active participants in table games by providing a step-by-step confidence building path from standalone to "Party Style" "Spin Game" deployments, and finally to the actual table games. Countdown timers may be configured to encourage and even reward players to place their wagers before the timer reaches zero—when "No More Bets" is called—and the "Game Wheel" is spun, thereby ensuring that casino target goals of "hands per minute" are met or exceeded. (See Published US Patent Application Document Nos. 20070191090 and 20050282608) The net result of this new gaming concept for players is that they can enjoy a fast-paced, high-energy gaming experience with a vast array of wagers from which to choose and play by themselves in a standalone configuration or as part of a group in "Party Style" where they may win and lose together or bet against one another. The casinos may enjoy greater overall returns from a gaming platform designed to generate multiple potential winning outcomes during each round of game play, which, based upon the quantity and value of players' wagers, may easily equate to numerous rounds of traditional game play on other EGMs and even table games.

The present invention may provide a new multiple wager, multiple potential winning outcome gaming platform that has many of the advantages of the electronic casino games mentioned heretofore and many novel features that result in a new multiple wager, multiple potential winning outcome gaming platform which is not anticipated, rendered obvious, suggested, or even implied by any of the prior art electronic casino games, either alone or in any combination thereof.

To attain this, the present invention generally comprises a completely electronic, or hybrid combination of electronic and mechanical components, video-based Electronic Gaming Machine (EGM), deployable in both standalone and multi-player "Party Style" configurations. These configurations afford players the opportunity to place multiple wagers upon multiple potential winning outcomes within a single round of game play. The platform may be deployed in numerous variations and is easily customized with various gaming themes, as well as casino specified odds, payouts, and prizes. The software platform controls all functions of the game including the player interface, which allows the player to interact with the game, the gaming engine, which controls how the game plays out based upon player input, and the management interface, which allows the game manufacturer and casinos to customize various parameters of the game, employ security and game tracking measures, and access various reporting features. The player interface, gaming engine, and management interface are not individual components, but rather functions of the software platform as a whole. Since these interfaces are relatively standardized throughout the industry, primary description will concentrate on detailing the Game Concept and the unique specifics of the "Spin Game" design and functionality. The "Game Balls" in the completely electronic version of the game are graphic representations displayed onscreen. The combined electro-mechanical hybrid version of the game may feature "physical" balls that strictly adhere to compliance standards of weight, size, shape, texture, etc. While example descriptions in this document will focus primarily upon the electronic version of the game, they should in no way be regarded as limiting. The "Game Wheel" in the completely electronic version of the game is a graphic representation displayed onscreen. The combined electro-mechanical hybrid version of the game may feature a "physical" wheel that strictly adheres to compliance standards of weight, size, shape, balance, coefficient of friction, etc. While example descriptions in this document will focus primarily upon the electronic version of the game, they should in no way be regarded as limiting. The Betting Area is the center of interaction for the player. As such, a large portion of the EGM display screen, or in certain deployments an entirely separate display screen, may be devoted to this function. The Status and Information Area is updated throughout the course of game play and reports important information to players, including but not limited to the wagers they have placed along with real-time updates of the fulfillment of their wagers, thereby heightening their gaming experience and better facilitating wager modifications as well as repeat wagers. Game Variations include modifications made to the "Game Wheel" Channels and Rings, "Game Ball" Types and Quantities, as well as Betting and Status and Information Areas to adapt the "Spin Game" to a specific set of desired rules including but not limited to those associated with table games employing cards, dices, tiles, balls, etc. Game Themes consist of graphics, sound effects, animations, multi-media presentations and physical displays which may be applied to the "Game Wheel" Channels and Rings, "Game Ball" Types, Betting Area, Status and Information Area, and areas surrounding the game to attract players, maintain their interest, and provide a unique, fun-filled gaming experience.

There has thus been outlined, rather broadly, the more important features of the invention in order that the detailed description thereof may be better understood, and in order that the present contribution to the art may be better appreciated. There are additional features of the invention that will be described hereinafter. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should in no way be regarded as limiting.

An aspect of the present invention is to provide a multiple wager, multiple potential winning outcome gaming platform that will overcome the shortcomings of the prior art devices.

Another aspect of the present invention is to provide a multiple wager, multiple potential winning outcome gaming platform for creating a new style of Electronic Gaming Machine (EGM) that delivers a more thrilling and entertaining gaming experience by providing players with multiple wagering opportunities on multiple potential winning outcomes through a gaming platform that is deployable in both standalone and "Party Style" multi-player configurations. The resulting "Spin Game" platform may be played in its native configuration as well as easily themed to allow variations including but not limited to casino table games, sporting teams and events, entertainment, film, television, and celebrities, as well as various other pop-culture fashions and trends. Specific deployments may be used to aid in transitioning "slots only" players to active participants in table games by providing a step-by-step confidence building path from standalone to "Party Style" "Spin Game" deployments, and finally to the actual table games. Countdown timers may be configured to encourage and even reward players to place their wagers before the timer reaches zero—when "No More Bets" is called—and the "Game Wheel" is spun, thereby ensuring that casino target goals of "hands per minute" are met or exceeded. The net result of this new gaming concept for players is that they can enjoy a fast-paced, high-energy gaming experience with a vast array of wagers from which to choose and play by themselves in a standalone configuration or as part of a group in "Party Style" where they may win and lose together or bet against one another. The net result of this new gaming concept for casinos is that they may enjoy greater overall returns from a gaming platform designed to generate multiple potential winning outcomes during each round of game play, which, based upon the quantity and value of players' wagers, may easily equate to numerous rounds of traditional game play on other EGMs and even table games.

Another aspect is to provide a multiple wager, multiple potential winning outcome gaming platform that offers players a new style of game play in contrast to current Electronic Gaming Machines (EGMs) that have, over time, become stale and virtually indistinguishable from one another.

Another aspect is to provide a multiple wager, multiple potential winning outcome gaming platform that provides players with a more thrilling and fulfilling gaming experience by allowing players to play as individuals in a standalone cabinet or as a group in a "Party Style" deployment in which players may wager together or against one another.

Another aspect is to provide a multiple wager, multiple potential winning outcome gaming platform that offers players multiple wagering opportunities, ranging from simple to complex, and including high hit frequency, small payout wagers as well as low hit frequency, high payout wagers. One of the unique features of the "Spin Game" is that players have the opportunity to place multiple wagers on multiple winning events during each round of game play. Based upon the quantity and value of players' wagers, a single round of game play in the "Spin Game" may easily equate to numerous rounds of traditional game play on other EGMs and even table games.

Another aspect is to provide a multiple wager, multiple potential winning outcome gaming platform that encourages players to learn how to play table games by providing table game mechanics and wagers in EGM variations. Players may gain experience and build their confidence in the comfort of a standalone EGM. Given that the "Spin Game" is capable of generating multiple winning events during a single round of game play, in a relatively short period of time, players may accumulate the experience of hundreds if not thousands of rounds of game play in a fraction of the time it would take through traditional play. Players may then migrate to the "Party Style" deployment and play with and against other players, culminating in the players' graduation to the actual table games upon which the variations of the "Spin Game" they played were based.

Another aspect is to provide a multiple wager, multiple potential winning outcome gaming platform capable of ensuring that target "rounds of game play per minute" goals are met or exceeded by enabling a "No More Bets" countdown timer. Players may be gently encouraged, persuaded, and possibly even rewarded to place their wagers before the timer reaches zero. This timer would primarily be used in "Party Style" deployments to prevent a single player from slowing down the action of the game; however, it may also be used as an added incentive and/or motivational tool in standalone deployments.

Other aspects and advantages of the present invention will become obvious to the reader and it is intended that these objects and advantages are within the scope of the present invention.

To the accomplishment of the above and related technology, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2—A table displaying various optional wagers on a standalone CAROUSEL™ "Spin Game."

FIG. 3—An alternative table displaying various optional wagers on a standalone CAROUSEL™ "Spin Game."

DETAILED DESCRIPTION OF THE INVENTION

Figure 1A:
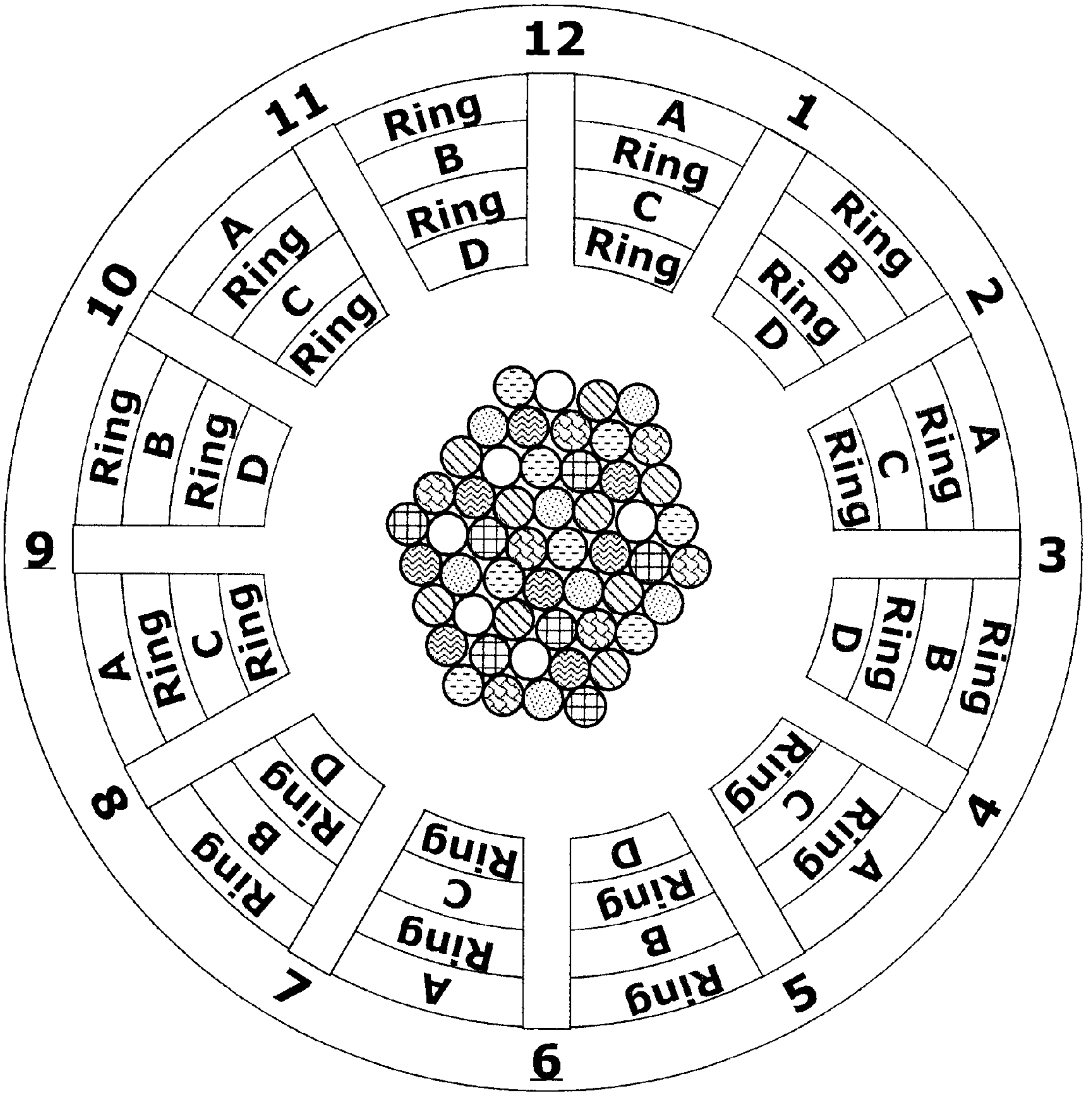
FIG. 1A—Front view example of a 12 Channel, 4 Ring "Game Wheel of the "Spin Game."

The present technology includes a method of gaming play and a gaming system. The latter may contain:

a) a processor;

b) a video display monitor; and c) dealer and controls, player input and player controls and the like;

wherein the processor contains both game rules and payment rules for winning and losing outcomes according to the game rules;

wherein the processor is in communication with a random number generator;

the random number generator randomly selecting game elements from a first set of game elements having at least two different identifying characteristics that can be used according to the game rules;

the processor providing image data to the video display monitor to display provision of the randomly selected game elements from a central location into a radial distribution of channels or rings into which the gaming elements may distribute for placement in a display mode for determining winning outcomes. The gaming system may have all available game elements provided by the processor displayed on the display screen at the same time. The gaming system may have all available gaming elements provided in the central area of a displayed radial distribution of channels or rings and where the processor may provide image data of individual game elements moving into channels or rings.

A process for playing a wagering game on the gaming system described above may provide a predetermined number of gaming elements that are distributed through the channels or rings into a display mode and then the processor further displays winning and losing outcomes. The process may provide a display of winning outcomes including a showing on the display screen an amount of award provided on an underlying wager.

Turning now descriptively to the drawings, in which similar reference characters denote similar elements throughout the several views, the attached figures illustrate a multiple wager, multiple potential winning outcome gaming platform, which comprises a completely electronic, or hybrid combination of electronic and mechanical components, video-based Electronic Gaming Machine (EGM), deployable in both standalone and multi-player "Party Style" configurations, that affords players the opportunity to place multiple wagers upon multiple potential winning outcomes within a single round of game play. The platform may be deployed in numerous variations and is easily customized with various gaming themes, as well as casino specified odds, payouts, and prizes.

The software platform controls all functions of the game including the player interface, which allows the player to interact with the game, the gaming engine, which controls how the game plays out based upon player input, and the management interface, which allows the game manufacturer and casinos to customize various parameters of the game, employ security and game tracking measures, and access various reporting features. The player interface, gaming engine, and management interface are not individual components, but rather functions of the software platform as a whole. Since these interfaces are relatively standardized throughout the industry, primary description will concentrate on detailing the "Game Concept" and the unique specifications of the "Spin Game" design and functionality.

The "Game Balls" in the completely electronic version of the game are graphic representations displayed onscreen. The combined electro-mechanical hybrid version of the game may feature "physical" balls that strictly adhere to compliance standards of weight, size, shape, texture, etc. While example descriptions in this document will focus primarily upon the electronic version of the game, they should in no way be regarded as limiting.

The "Game Wheel" in the completely electronic version of the game is a graphic representation displayed onscreen. The combined electro-mechanical hybrid version of the game may feature a "physical" wheel that strictly adheres to compliance standards of weight, size, shape, balance, coefficient of friction, etc. While example descriptions in this document will focus primarily upon the electronic version of the game, they should in no way be regarded as limiting.

The Betting Area is the center of interaction for the player. As such, a large portion of the EGM display screen, or in certain deployments an entirely separate display screen, may be devoted to this function.

The Status and Information Area is updated throughout the course of game play and reports important information to players, including but not limited to the wagers they have placed along with real-time updates of the fulfillment of their wagers, thereby heightening their gaming experience and better facilitating wager modifications as well as repeat wagers.

Game Variations include modifications made to the "Game Wheel" Channels and Rings, "Game Ball" Types and Quantities, as well as the Betting and Status and Information Areas to adapt the "Spin Game" to a specific set of desired rules including but not limited to those associated with table games employing cards, dices, tiles, balls, etc.

Game Themes consist of graphics, sound effects, animations, multi-media presentations and physical displays which may be applied to the "Game Wheel" Channels and Rings, "Game Ball" Types, Betting Area, Status and Information Area, and areas surrounding the game to attract players, maintain their interest, and provide a unique, fun-filled gaming experience.

While the "Spin Game" may be deployed as either a completely electronic or a hybrid combination of electronic and mechanical components, descriptions in this document will focus primarily upon the electronic version of the game and should in no way be regarded as limiting.

The basic "Game Concept" of the "Spin Game" is somewhat similar in nature to Roulette, in which a single ball is spun around the rim of a rotating wheel until the velocity of the ball dwindles to the point that gravity pulls it to the center of the wheel, where it comes to rest upon a single winning number and coinciding red, black or green color. Unlike Roulette, the "Spin Game" employs multiple "Styles" of balls, identifiable by color, markings, other variations, etc., that are initially placed in the center of the "Game Wheel".

When game play begins, the "Game Wheel" is spun and accelerated to the point at which the balls succumb to the applied centripetal force and are pushed to the outside edge of the wheel. Channels along the outer edge of the wheel collect the balls. The wheel continues to spin until such time as all the balls have been relocated to the Channels or all the Channels are filled—the game may be deployed where the number of balls exactly equals, exceeds, or is less than the holding capacity of all the Channels. The wheel is then brought to a stop and the balls in the Channels are examined for winning combinations based upon the quantity and distribution of each "Type" of ball.

A wide variety of wagers may be placed ranging from the most basic, such as a particular Channel containing any winning combination of balls, to more advanced, such as one or more Channels containing a specific, higher, or lower quantity of a certain "Type" of ball. For example, if the "Style" of the balls in play is identifiable by color, the "Types" of balls in play may include red, white, blue, green, etc. The player may elect to wager that one or more Channels will contain a disproportionate number of green balls—typically a larger or smaller percentage than the average distribution based upon the quantity of each "Type" of ball in play and the Channel capacities.

The technology described herein may include, by way of non-limiting examples, a gaming system comprising:

a) a processor;

b) a video display monitor; and c) player input controls comprising at least player wager entry control for placing a wager on a wagering game on the gaming system;

wherein the processor contains both game rules and payment rules for winning and losing outcomes according to the game rules;

wherein the processor is in communication with a random number generator;

the random number generator randomly selecting game elements from a first set of game elements having at least two different identifying characteristics that can be used according to the game rules;

the processor providing image data to the video display monitor to display provision of the randomly selected game elements from a central location into a radial distribution of rings or channels for placement in a display mode for determining winning outcomes. All available game elements may be provided by the processor for display on the display screen at the same time. All available gaming elements may alternatively be provided in the central area of a displayed radial distribution of channels and where the processor provides image data of individual game elements moving into channels. A process for playing a wagering game on the gaming system described above might have a predetermined number of gaming elements are distributed through the channels into a display mode and then the processor further displays winning and losing outcomes, or wherein the display of winning outcomes includes showing on the display screen an amount of award provided on an underlying wager.

The gaming system described above may have the processor is configured to evaluate a distribution of symbols provided by the random number generator and displayed on the video display monitor and the processor is configured to resolve wagers on the wagering game. The processor may also or alternatively be configured so that wagering game is an underlying wagering game on the gaming system on which at least some winning resolutions are based on first outcomes displayed on the video display monitor and at least some winning outcomes on wagers are provided in proportion to the wagers, or the processor may be configured so that wagering game comprises a bonus event that is triggered in an underlying wagering game on the gaming system on which at least some winning resolutions in the bonus event are based on second outcomes displayed on the video display monitor and at least some winning outcomes in the bonus event wagers are provided in proportion to the wagers on the underlying game, or the processor is configured so that wagering game comprises a bonus event that is triggered in an underlying wagering game on the gaming system on which at least some winning resolutions in the bonus event are based on second outcomes displayed on the video display monitor and at least some winning outcomes in the bonus event wagers are provided as jackpot amounts that are not in proportion to the wagers on the underlying game.

In one preferred mode of play, the identifiers are placed on channels or rings and winning outcomes are based upon achievement of at least one predetermined distribution of virtual game elements within the channels or rings. In these gaming systems, the winning outcomes may be based upon a wager on an underlying game, a bonus wager, a bonus event, a side best, proposition wagers or progressive jackpot wagers.

Figure 1B:
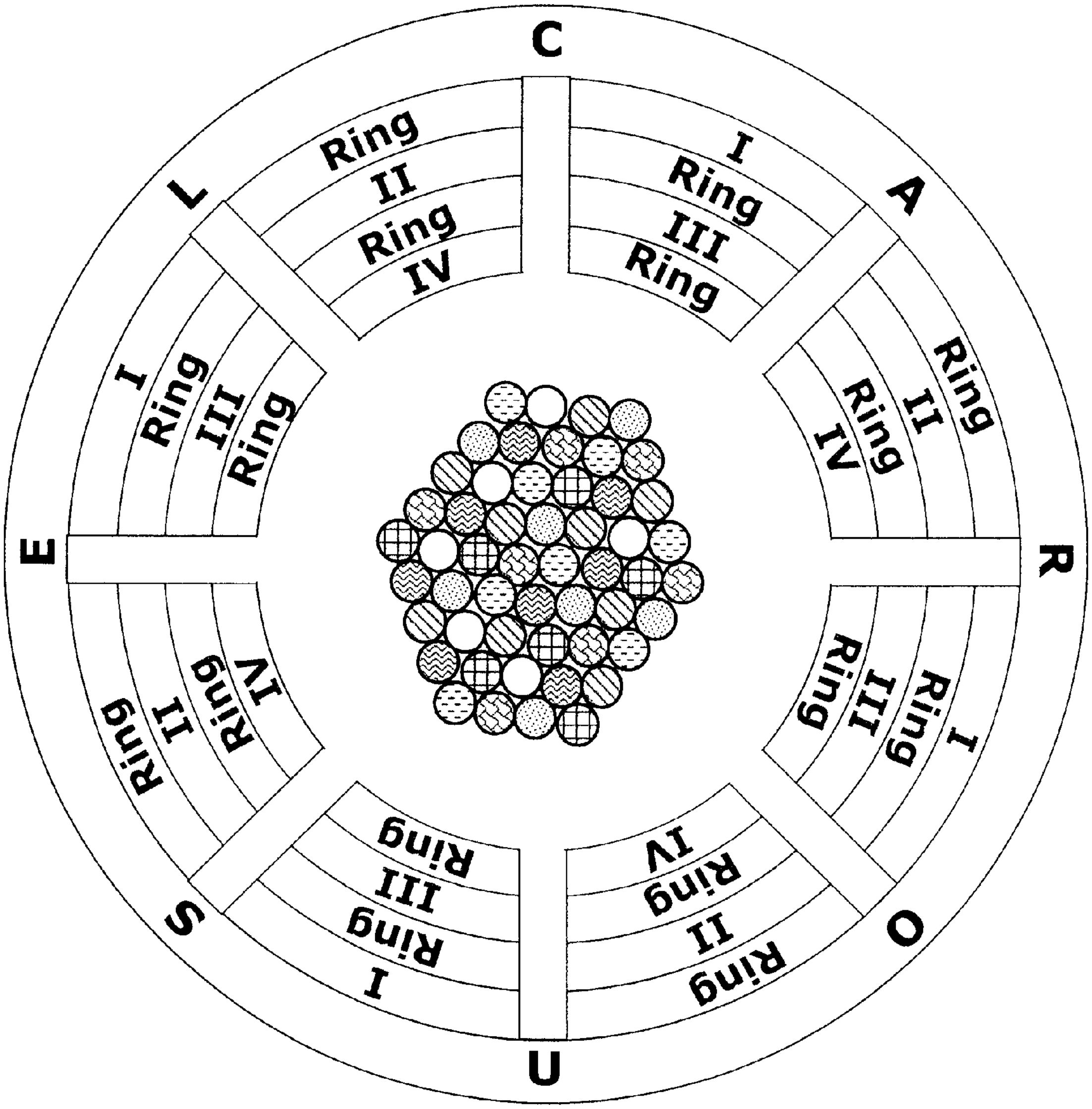
FIG. 1B—Front view example of an alternative 12 Channel, 4 Ring Game Wheel of the "Spin Game."

For example, as illustrated in FIG. 1—the "Spin Game" may be deployed utilizing a "Game Wheel" with 12 available Channels, each with a capacity to hold four balls. Featuring abundant wagering opportunities with numerous potential winning events in each game, coupled with the dynamic motion of a highly visual concept that can be played in both individual standalone or multi-player, "Party Style" CAROUSEL™ deployments, the "Spin Game" is certain to bolster player entertainment value, increase player retention, lengthen game play session duration, and significantly increase casino revenues.

Apparatus and systems used to enable the practice of this technology may include, by way of non-limiting examples, an intelligent multi-player electronic gaming system that may also include various authentication and/or validation components which may be used for authenticating/validating specified intelligent multi-player electronic gaming system components such as, for example, hardware components, software components, firmware components, information stored in the intelligent multi-player electronic gaming system memory, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Player station system components/devices may also include other devices/component(s) such as, for example, one or more of the following (or combinations thereof): sensors, cameras, control consoles, transponders, personal player (or user) displays, wireless communication component(s), power distribution component(s), user input device (UID) docking component(s), player tracking management component(s), game state tracking component(s), motion/gesture detection component(s), etc.

Sensors may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; detecting the presence and/or identity of UIDs, detecting player (and/or dealer) movements/gestures, etc.

In one implementation, at least a portion of the sensors and/or input devices may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the intelligent multi-player electronic gaming system player displays (and/or UID displays) may include input functionality for allowing players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.)

Wireless communication components 456 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication—Interface and Protocol (NFCIP-1)", published by ECMA International (www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 4 devices using such wireless communication protocols.

Power distribution components may include, for example, components or devices which are operable for providing wireless power to other devices. For example, in one implementation, the power distribution components may include a magnetic induction system which is adapted to provide wireless power to one or more portable UIDs at the intelligent multi-player electronic gaming system. In one implementation, a UID docking region may include a power distribution component which is able to recharge a UID placed within the UID docking region without requiring metal-to-metal contact.

In at least one embodiment, motion/gesture detection component(s) may be configured or designed to detect user (e.g., player, dealer, and/or other persons) movements and/or gestures and/or other input data from the user. In some embodiments, each player station may have its own respective motion/gesture detection component(s). In other embodiments, motion/gesture detection component(s) may be implemented as a separate sub-system of the intelligent multi-player electronic gaming system which is not associated with any one specific player station.

In at least one embodiment, motion/gesture detection component(s) may include one or more cameras, microphones, and/or other sensor devices of the intelligent multi-player electronic gaming system which, for example, may be used to detect physical and/or verbal movements and/or gestures of one or more players (and/or other persons) at the gaming table. Additionally, according to specific embodiments, the detected movements/gestures may include contact-based gestures/movements (e.g., where a user makes physical contact with the multi-touch surface of the intelligent multi-player electronic gaming system) and/or non-contact-based gestures/movements (e.g., where a user does not make physical contact with the multi-touch surface of the intelligent multi-player electronic gaming system).

In one embodiment, the motion/gesture detection component(s) may be operable to detect gross motion or gross movement of a user (e.g., player, dealer, etc.). The motion detection component(s) may also be operable to detect gross motion or gross movement of a user's appendages such as, for example, hands, fingers, arms, head, etc. Additionally, in at least one embodiment, the motion/gesture detection component(s) may further be operable to perform one or more additional functions such as, for example: analyze the detected gross motion or gestures of a participant; interpret the participant's motion or gestures (e.g., in the context of a casino game being played at the intelligent multi-player electronic gaming system) in order to identify instructions or input from the participant; utilize the interpreted instructions/input to advance the game state; etc. In other embodiments, at least a portion of these additional functions may be implemented at the master gaming controller and/or at a remote system or device.

In at least one embodiment, motion/gesture analysis and interpretation component(s) may be operable to analyze and/or interpret information relating to detected player movements and/or gestures. For example, in at least one embodiment, motion/gesture analysis and interpretation component (s) may be operable to perform one or more of the following types of operations (or combinations thereof): recognize one or more gestures performed by users interacting with the intelligent multi-player electronic gaming system; map various types of raw input data (e.g., detected by the multi-touch sensor and display system) to one or more gestures; identify groupings of two or more contact regions (e.g., detected by the multi-touch sensor and display system) as being associated with each other for the purpose of gesture recognition/identification/interpretation; determine and/or identify the number or quantity of contact regions associated with a gesture performed by a user interacting with the intelligent multi-player electronic gaming system; determine and/or identify the shapes and/or sizes of contact regions relating to a gesture performed by a user interacting with the intelligent multi-player electronic gaming system; determine and/or identify the locations of the contact regions associated with a gesture performed by a user interacting with the intelligent multi-player electronic gaming system; determine and/or identify the arrangement (e.g., relative arrangement) of contact regions associated with a gesture performed by a user interacting with the intelligent multi-player electronic gaming system; map one or more contact regions (e.g., associated with a gesture performed by a user interacting with the intelligent multi-player electronic gaming system) to one or more digits (e.g., fingers, thumbs, etc.) of the user's hand(s); map an identified gesture (e.g., performed by a user interacting with the intelligent multi-player electronic gaming system) to one or more function(s) (such as, for example, a specific user input instruction that is to be received and processed by the gaming controller); create an association between an identified gesture (e.g., performed by a user interacting with the intelligent multi-player electronic gaming system) and the user (e.g., origination entity) who performed that gesture; create an association between an identified function (e.g., which has been mapped to a gesture performed by a user interacting with the intelligent multi-player electronic gaming system) and the user (e.g., origination entity) who performed the gesture relating to the identified function; cause one or more function(s) to be initiated on behalf of a given user at the gaming system, for example, in response to an input gesture performed by the user; cause one or more function(s) to be initiated on behalf of a given user at the gaming system, for example, in response to an input gesture performed by the user; [0261] provide a specific set of input instructions (e.g., which have been identified as originating from a specific user at the gaming system) to the gaming controller in response to an input gesture performed by the user; identify continuous contacts/touches; detect contacts, touches and/or near touches and provide identification and tracking of detected contacts, touches and/or near touches; [0264] etc.

According to various embodiments, one method of utilizing the intelligent multi-player electronic gaming system may comprise: 1) initiating in the master gaming table controller the wager-based game for at least a first active player; 2) receiving in the master gaming table controller information from the object detection system indicating a first physical object is located in a first video display area associated with the first active player where the first physical object includes a transparent portion that allows information generated in the first video display area to be viewed through the transparent portion; 3) determining in the master gaming controller one of a position, a shape, an orientation or combinations thereof of the transparent portion in the first video display area, 4) determining in the master gaming table controller one of a position, a shape, an orientation or combinations thereof of a first video display window in the first video display area to allow information generated in the first video display window to be viewable through the transparent portion of the first physical object; 5) controlling in the master gaming controller a display of first video images in the first video display window where the first video images may include information associated with the first active player; 6) controlling in the master gaming controller a display of second video images of including information related to the play the wager-based game in the first video display area; and 7) determining in the master gaming controller the results of the wager-based game for the first active player.

In particular embodiments, the first physical object may be moved during game play, such as during a single wager-based game or from a first position/orientation in a first play of the wager-based game to a second position/orientation in a second play of the wager-based game. The position/orientation of the first physical object may be altered by a game player or a game operator, such as a dealer. Thus, the method may also comprise during the play of the wager-based game, determining in the master gaming controller one of a second position and a second orientation of the transparent portion in the first video display area and determining in the master gaming table controller one of a second position and a second orientation of the first video display window in the first video display area to allow information generated in the first video display window to be viewable through the transparent portion of the first physical object.

In particular embodiments, the second video images may include one or more game objects. The one or more game objects may also be displayed in the first video window and may include but are not limited to a chip, a marker, a die, a playing card or a marked tile. In general, the game objects may comprise any game piece associated with the play of wager-based table game. The game pieces may appear to be 3-D dimensional in the rendered video images.

When placed on the first surface, a footprint of the first physical object on the first surface may be one of a rectangular shaped or a circular shaped. In general, the foot print of the first physical object may be any shape. The foot print of the first physical object may be determined using the object detection system.

The method may further comprise determining in the master table gaming controller an identity of the first active player and displaying in the first video display window player tracking information associated with the first active player. The identity of the first active player may be determined using information obtained from the first physical object. In particular embodiments, the information obtained from the first physical object may be marked or written on the first physical object and read using a suitable detection device or the information may be stored in a memory on first physical object, such as with an RFID tag and read using a suitable reading device.

In another example embodiment, the method may further comprise, 1) determining in the master table gaming controller the information displayed in the first video display window includes critical game information, 2) storing to a power-hit tolerant non-volatile memory the critical game information, the position, the shape, the orientation or the combinations thereof of the first video display window and information regarding one or more physical objects, such as but not limited to there locations and orientation on the first surface, 3) receiving in the master table gaming controller a request to display the critical game information previously displayed in the first video display window; 4) retrieving from the power-hit tolerant non-volatile memory the critical game information and the position, the shape, the orientation or the combinations thereof of the first video display window; 5) controlling in the master table gaming controller the display of the critical game information in the first video display window using the position, the shape, the orientation or the combinations thereof retrieved from the power-hit tolerant non-volatile memory and 6) providing information regarding the one or more physical objects, such that their placement and location on the first surface may be recreated when the one or more physical objects are available.

In at least one embodiment, master gaming controller may include one or more of the following (or combinations thereof): Authentication/validation components; Device drivers; Logic devices, which may include one or more processors; Memory, which may include one or more of the following (or combinations thereof): configuration software, non-volatile memory, EPROMS, RAM, associations between indicia and configuration software, etc.; Interfaces, etc.

In at least one embodiment, player station system may include one or more of the following (or combinations thereof): Sensors; User input device (UID) docking components; One or more cameras; One or more microphones; Secondary display(s); Input devices; Motion/gesture detection components; Funds center system; etc.

To better facilitate the description of game functionality, the "Spin Game" may be divided into six key components: (1) The "Game Balls", (2) The "Game Wheel", (3) The Betting Area, (4) The Status and Information Area, (5) Game Variations, and (6) Game Themes.

(1) The "Game Balls" in the completely electronic version of the game are graphic representations displayed onscreen. The combined electro-mechanical hybrid version of the game may feature "physical" balls that strictly adhere to compliance standards of weight, size, shape, texture, etc. While descriptions in this document will focus primarily upon the electronic version of the game, they should in no way be regarded as limiting. The balls employed in the game are of a designated "Style" which is identifiable by color, markings, other variations, etc. Example "Styles" may include but are not limited to specific colors and/or color combinations, representations of dice values, representations of card values and/or card suits, representations of tile values, etc.

A particular ball "Style" may feature two or more "Types" or variations of the particular "Style". For instance, a solid color ball "Style" may feature ball "Types" including red, white, blue, green, etc. A dice value representation ball "Style" may include six ball "Types" with standard dice value markings of one through six. A card value and card suit representation ball "Style" may include 52 ball "Types" (53 or 54 if one or two Jokers are employed) with standard card value markings of Ace through King for each suit.

Ball "Types" may be represented by a single ball or multiple balls. For example, a solid color ball "Style" may feature the following ball "Types" multiples—four red balls, three white balls, two blue balls, and one green ball. Implementation of games based upon existing dice, card, tile, etc. games may naturally feature multiples of ball "Types" that correspond to their inherent requirements.

For example, if a game is based upon a single deck of 52 cards, 52 ball "Types" (one for each card value of each suit) with a single ball for each ball "Type" would be employed. If a game is based upon five traditional, six-sided dice, six ball "Types" (one for each dice face value of one through six) with five multiples of each ball "Type" would be employed.

There is virtually no limit to the available ball "Styles", which should contain at least one ball "Type" with at least one ball of each ball "Type". There is virtually no limit to the number of ball "Types" within a particular "Style" as well as the number of multiples of a particular ball "Type".

(2) The "Game Wheel" in the completely electronic version of the game is a graphic representation displayed onscreen. The combined electro-mechanical hybrid version of the game may feature a "physical" wheel that strictly adheres to compliance standards of weight, size, shape, balance, coefficient of friction, etc. While descriptions in this document will focus primarily upon the electronic version of the game, they should in no way be regarded as limiting. The basic design of the "Game Wheel" is similar in nature to traditional Roulette wheels currently in use in casinos throughout the world. The functionality of traditional Roulette wheels employs a single ball which is spun around the rim of the wheel until the velocity of the ball dwindles to the point that gravity pulls the ball to the center of the wheel where it comes to rest upon a single winning number and coinciding red, black, or green color.

The key differences in the functionality between traditional Roulette and the "Spin Game" are that in the "Spin Game": Typically two or more balls are used, The starting position of the balls is in the center of the "Game Wheel", and The "Game Wheel" is spun with increasing speed until the centripetal force exerted upon the balls pushes them from the center to the outer edge of the wheel.

The outer edge of the "Game Wheel" typically contains two or more Channels which serve to collect the balls. An individual Channel may collect one or more balls depending upon the depth or capacity of the Channel. For Channels with multi-ball capacities, the first ball collected will be forced to the bottom of the Channel—the outermost position in the Channel furthest from the center of the "Game Wheel". Each successive ball entering that Channel will be positioned or "stacked" single-file on top of the previous ball that entered the Channel, until such time as the Channel is filled to capacity or there are no more balls left to fill the remaining vacant positions in the Channel. In other words, centripetal force propels the balls to fill the Channel from the outermost vacant position of an available Channel inward until such time as the Channel is filled to capacity or no more balls are left to fill the remaining vacant spaces in the Channel.

The "Game Wheel" may spin in either direction (clockwise or counter clockwise), and the selection of the desired direction may be used as a player selectable option to cater to ritualistic players or as a means of providing the player the added feature of "perceived control" of an element of the game play. Further, the "Game Wheel" may spin as a whole single "unit" or be subdivided into zones which may spin at varying speeds and directions or remain completely stationary.

For example, the outside portion of the "Game Wheel" containing the collection Channels may be subdivided as a separate wheel zone which remains stationary. The inner zone of the wheel would spin up to speed, propelling the balls towards the outer stationary Channels for collection. In the electro-mechanical hybrid version of the game, stationary Channels would be sloped slightly downward to allow the balls to be collected as there would be no rotational force to hold them in place once they entered the stationary Channels.

Further, the portion of the "Game Wheel" that is in motion may be further sub-divided into separate wheel zones that rotate at varying speeds and directions. In other words, the "Game Wheel" may employ one or more zones capable of rotating in either direction at varying rates of speed for the purpose of randomly moving the balls until such time as they are forced to the outermost edge of the "Game Wheel" and distributed into the awaiting collection Channels. Naturally, this is most easily accomplished in the completely electronic form of the game, as there are virtually no design limitations to a video representation of this concept. In fact, in video form, wheel zones in motion may be even further sub-divided to contain multiples of even smaller spinning wheels to further aid in the randomization of the distribution of the balls.

The actual random distribution of the balls into the Channels may be determined by simple or complex physics based upon the direction and speed of the wheel zones' action on the balls coupled with the interactions of the balls themselves or by simple of use a random number generator (RNG) to place balls within specific Channel positions, thereby making the interaction of the moving wheel zones and balls simply "for show" in the manner that spinning reels on a slot machine have no real impact on the result of the game and are simply used to entertain the player by building a level of suspense. Of course, the hybrid form of the game, which employs both a physical "Game Wheel" and "Game Balls", would be forced to rely upon the physical interactions of the wheel zones and balls in motion in order to determine the placement of the balls within each of the Channel positions.

While the completely electronic form of the "Spin Game" may indeed make use of the RNG for placement, utilizing true game physics, which has become common place in many realistic arcade games such as golf and bowling simulations, and allowing the player to contribute some measure of input to the physics calculations, be it something as simple as choosing the direction of rotation of one or more wheel zones or more complex as allowing the player to utilize a touch screen, wheel, knob, handle, lever, trackball, joystick, or other form of input device to generate data to be included in the calculations of the wheel zone velocities, instills confidence in the player the game is not only fair but partially under their influence, albeit to a very small degree, and that the results of the game are unfolding right before their eyes, rather than being predetermined by the RNG the moment they press a button to begin play.

Examples of player input may include but are not limited to: Selecting the rotational direction one or more "Wheel Sections", Altering the rotational direction of a "Wheel Section" during game play, Providing direct input via an input device such as a touch screen, wheel, knob, handle, lever, trackball, joystick, etc. to be utilized in the game physics calculations such as determining initial wheel zone speed or rate of speed increase, increasing or decreasing wheel zone speed or rate of speed increase or decrease, and Triggering an event such as determining the precise moment the balls are added to the "Game Wheel", such as being dropped from a virtual container above the center of the wheel.

While casinos focus primarily on speed of play to generate maximum returns, the impact of player input should not be discounted. Consider the popularity of slot tournaments and note that while players need only press the spin button once until the reels stop, the vast majority of players constantly "hammer away" at the spin button, even while the reels are still spinning. Naturally, these extra button presses have no impact on the results of each spin, however, it is often the player's perception that their constant input is somehow contributing to the outcome of the game, even if the perception is that they may start the next spin milliseconds faster than if they stopped pressing the button and waited for the reels to stop spinning.

By offering these optional forms of player input, which contribute minimally to the actual outcome of the game as well as the amount of time required to complete a round of game play, players are granted the perception that they have a sense of control over their game play and that the final outcome is based, albeit minutely, on their contributed input. When players perceive their "fate to be in their hands", they become far more involved in their game play, leading to longer play sessions and an overall increase in gaming revenues.

(3) The Betting Area is the center of interaction for the player. As such, a large portion of the EGM display screen, or in certain deployments an entirely separate display screen, may be devoted to this function. Game speed measures, such as hands-per-minute common in video poker or spins per minute in video slots, are valuable in determining the profitability of EGMs in which there are a relatively small or fixed number of wagers that may be placed. However, by increasing the number of potential wagers available in a round of game play, players may be enticed to wager on multiple outcomes, many of which are mutually attainable, by offering larger payouts and higher return percentages as incentives for making concurrent wagers, preferably with maximum credits bet. This style of wagering is common to table games such as Roulette and Craps. By adopting this approach to EGMs, the significance shifts from the number of plays per minute to the quantity and value of the wagers placed each round. By making it more attractive for players to place multiple wagers, with larger wagers as well as an increased number of concurrent wagers resulting in higher returns and/or better odds payouts, casinos can greatly improve their holds while increasing player entertainment value.

Due to the intrinsic design of the "Spin Game", wagering opportunities are virtually limitless, ranging from very simple to highly customized. Further, the payout percentage may be adjusted in real time by moderating the size of the payouts with the quantity and value of concurrently placed wagers. For example, a player may receive a higher overall payout percentage by exceeding a specific threshold of credits bet across multiple wagers. In essence, players may stand a better chance of winning larger awards more frequently by placing additional concurrent wagers with maximum credits bet. Naturally the casino benefits significantly from this approach, as a single round of game play may consist of numerous wagers, with "maximum bets" being those most advantageous to players. While players may win more frequently at high percentage payouts by placing multiple "maximum bet" wagers, mathematically speaking, casinos will experience significantly increased holds due to the increased number of larger wagers placed during each round of game play. Because they are winning some of their wagers, even though on average those wins will most likely not offset the cost of all the wagers placed during the round, the excitement and adrenaline rush are maintained, and players are motivated to continue placing "maximum bets" on numerous wagers to increase their odds of winning. Net results are longer play sessions with significantly higher returns to the casinos. Additionally, even in shorter play sessions, by placing numerous concurrent wagers each round, players may easily exceed the equivalent number of credits wagered per minute in games such as video poker and slots machines within the same time frame.

Concurrent wagering is a profit-proven strategy in casino gaming, especially among table games, and has become more and more popular in video slots and video poker EGMs. However, in video slots players may typically only choose from the available "lines"—most often without any control over selecting which lines to play as the video slot adds additional lines in a specific order—and are limited to wagering a specific amount across all selected lines. Further, in video poker, players are typically only offered the opportunity to play additional hands using the "hold cards" of their original hand across all subsequent hands wagered or the chance to continue playing the next hand based upon the winning outcome of their current hand. Again, the same amount is wagered across all hands.

Ideally, the flexibility of allowing players to vary their wagers and select from a wide range of potential winning outcomes without being forced to bet on undesired outcomes (i.e. video slots that don't allow for individual line selection or video poker games that don't allow players to continue playing the additional hands they've wagered because they've lost the first hand) empowers players with the freedom to bet as they desire in the same fashion as table games such as Craps and Roulette—now in an EGM—without incurring the fear and anxiety many players experience over placing their bets in the midst of a group of other players. Additionally, by providing players with an individual "Digital Felt Display", players can quickly and easily "mark" their concurrent wagers on their screen and watch their odds payouts adjust in real-time as they place additional wagers for the upcoming round of game play. Offering easy-to-select options with the freedom to pick and choose desired bets and wager independently, without the conditional limitations of slots and video poker, affords players a measure of control over their gaming experience completely independent of the game's outcome. EGMs such as this can indeed offer a significant number of concurrent wagering opportunities without forcing players to accept undesired bets as well as static wagering limitations, thereby granting players an exceptional gaming experience, quickly and easily custom-tailored to their desired wagers.

Due to the large number of available wagers, this document will address the primary categories in which specific wagers may be classified. These categories include: (A) Any Winning Event within a Channel, (B) Specified Winning Event within a Channel, (C) Specified Winning Event Across Multiple Channels, (D) Specified Winning Event within a Ring, (E) Specified Winning Event within the "Wheel Center", (F) Proposition Wagers, and (G) Bonus Events. Considering the vast array of methods of deployment, this description should in no way be regarded as complete or limiting.

(A) Any Winning Event within a Channel—This is perhaps the simplest wager as well as the most comprehensive. Any Channel may be selected, and players are paid if a winning event occurs within the chosen Channel. Using the solid colored ball "Style" game example with the following ball "Type" distribution—four red balls, three white balls, two blue balls, and one green ball—a winning event may be defined as a Channel containing a disproportionate number of a specific "Type" of ball. In this example, winning events may include Channels containing two or more red balls, two or more white balls, one or more blue balls, or a green ball with the option of awarding bonuses for balls exceeding the minimum requirement for a win. Depending upon Channel capacity, multiple winning events may occur within the same Channel. For example, if the Channel capacity is four balls and it contains three red balls and one blue ball, the values associated with each of the two winning events would be awarded. Two white balls, one blue ball, and one green ball, would award the values associated with three winning events.

(B) Specified Winning Event within a Channel—This is a more specific wager allowing players to select a Channel in which they believe the distribution of a chosen particular ball "Type" will exceed or (in some deployments) fall short of the expected distribution outcome. This outcome may be described as a Disproportionate Distribution of a Particular Ball "Type" within an Individual Channel. In other words, the player selects a ball "Type" and based upon the number of balls of the selected "Type" that are in play, as well as the number and capacity of available Channels, the player is presented with "over" and (in some cases) "under" threshold numbers for the available Channels. In most deployments, the capacity of each Channel will be identical, resulting in the same "over" and "under" threshold numbers for each Channel for a particular ball "Type". However, certain games may employ Channels of varying capacities, resulting in different "over" and "under" threshold numbers for each different Channel "size". The player then selects their desired Channel on the Game Wheel, which may be individually identified by numbers, letters, symbols, images, etc. and wagers that the Channel selected will contain either more than the "over" threshold or (in some cases) less than the "under" threshold of the selected ball "Type" when the round is completed. In certain deployments, combination "over OR under" as well as "over AND under" threshold wagers may also be offered.

For example, a game may consists of a set number of Channels, each with a capacity to hold five balls. Red, white, blue, green, silver, and gold ball "Types" may be available for selection with red balls being the most common, followed in succession by white, blue, green, silver, and finally gold balls being the least common. The player selects the red ball "Type" and since the Channel capacities are identical, the player is presented with "over" and "under" threshold numbers which are valid for any Channel—in this example, the "over" is three and the "under" is two. To avoid any potential confusion with Sportsbook "Over-Under" betting, the display may indicate winning outcomes as a Channel containing four or more red balls for the "over" and one or NO red balls for the "under". Bonuses may also be awarded for "over" wagers on a Channel that contains five red balls as well as "under" wagers on a Channel that contains NO red balls. Note that depending upon the number and distribution of ball "Types", as well as the number and capacity of the Channels, certain ball "Types" may lack an available "over" or "under" threshold wager. For example, if only one gold ball "Type" is in play, it is highly unlikely that an "under" threshold value of one would be offered, given that only one Channel may contain the single gold ball, resulting in all the remaining Channels being winners of the "under" wager.

Clearly, "over" threshold wagers are most common for ball "Types" in short supply, while "under" threshold wagers are more common for ball "Types" in abundance. Similarly, "over OR under" and "over AND under" combination wagers would typically apply to ball "Types" with larger distributions. In simplest form, every ball "Type" is capable of having an "over" threshold—in other words, each ball "Type" may offer a wager for each Channel to contain one or more balls of a given "Type" up to the maximum capacity of the Channel and depending upon the distribution of the ball "Type". While "under" threshold betting may be available for some ball types in most deployments, this particular type of bet is best reserved for specific deployments which employ a significant quantity of each ball "Type". Examples and descriptions in the document will concentrate primarily on "over" threshold wagers; however, this should in no way be regarded as limiting. Additional bonuses and/or bonus wagers may also be made available based upon unique circumstances given the order and distribution of specific ball types within a selected Channel. Such bonuses and wagers are discussed in greater detail in the (F) Proposition Wagers section.

(C) Specified Winning Event Across Multiple Channels—This is a more specific wager allowing players to select two or more Channels in which they believe the distribution of a chosen particular ball "Type" will fall short of or exceed the expected distribution outcome. This outcome may be described as a Disproportionate Distribution of a Particular Ball "Type" within Two or More Channels. In other words, the player selects a ball "Type" and based upon the number of balls of the selected “Type” that are in play, the player is presented with “over and under” threshold numbers for one, two, three, etc. Channels. The player then selects specific Channels on the Game Wheel, which may be individually identified by numbers, letters, symbols, images, etc. and wagers that the combined Channels selected will contain either more than the “over” threshold or (in some cases) less than the “under” threshold of the selected ball “Type”.

A multitude of wagering opportunities exists, as the player may select Multiple Channels for each particular ball “Type”. Further, for each particular ball “Type” the player may place multiple wagers on two or more Channels. In other words, if a game consists of eight Channels and the player desires to place multiple 2-Channel wagers for a particular ball “Type”, the player selects two of the available eight Channels for their first bet, followed by a different combination of two of the available eight channels for their next bet, etc. In this eight channel example, the player has a total of 28 unique 2-Channel wagers available for each ball “Type” in play. Similarly, if the player wishes to place a 3-Channel or 4-Channel bet, there are a total of 56 unique 3-Channel wagers available as well as a total of 70 unique 4-Channel wagers available for each ball “Type” in play in this example.

Due to the overwhelming number of potential wagers available, restrictions may be instituted on the number of Multiple Channel bets a player may make during a round of game play. Additionally, an easy-to-use interface for quickly and efficiently placing concurrent Multiple Channel wagers may be employed to minimize confusion and expedite the wagering process.

For example, the Betting Area may display the most common 2, 3, and 4-Channel wagers such as Channels 1-2, 2-3, 3-4, 4-5, 5-6, 6-7, 7-8, and 8-1 for 2-Channel wagers, 1-3, 2-4, 3-5, 4-6, 5-7, 6-8, 7-1, and 8-2 for 3-Channel wagers, 1-4, 2-5, 3-6, 4-7, 5-8, 6-1, 7-2, 8-3, as well as 1/3/5/7 (Odds), and 2/4/6/8 (Evens) for 4-Channel wagers. Each of the examples corresponding to a sequential group of Channels on the “Game Wheel” may be referred to as a “Segment”. In the case of Odds and Evens (every other Channel) in which the group Channels are separated by one or more Channels, a non-sequential group of Channels on the “Game Wheel” may be referred to as a “Series”. “Segments” and “Series” may be predefined and listed as available Multiple Channel wagers within the Betting Area and/or players may be allowed to designate their own custom selections of Channels for Multiple Channel wagers at the casino’s discretion.

(D) Specified Winning Event Within a Ring—This is a more specific wager allowing players to select a Ring in which they believe the distribution of a chosen particular ball “Type” will fall short of or exceed the expected distribution outcome. This outcome may be described as a Disproportionate Distribution of a Particular Ball “Type” within an Individual Ring. A Ring may be defined as the same “fill-position” across all Channels. In other words, if all Channels in a game have the same capacity, they will be filled from the outermost edge in towards the center of the Game Wheel until such time as all Channels are completely filled or no balls remain to fill the empty spaces left within the Channels. All balls residing in the first or outermost position of each Channel form the Outer or First Ring, which for the purpose of this document will be referred to as A-Ring. The next Ring in towards the center of the wheel would be designated as B-Ring. Games with a Channel capacity of four balls would have Rings A through D, with the D-Ring being the innermost. Five ball Channel capacity games would have Rings A through E, with the E-Ring being the innermost.

While not a requirement, it is suggested that number of Channels be evenly divisible by the Channel capacity. For example, a deployment with eight Channels may utilize a Channel capacity of four balls for all Channels. Using this approach, the total number of balls in any Ring would match the total number of balls in any two Channels. This would result in the same odds for any Ring or 2-Channel wager, as each Ring (A through D) would contain eight balls—exactly the same as two Channels, each containing four balls. Similarly, it is suggested that a deployment with ten Channels utilize a Channel capacity of five balls for all Channels. For a deployment with 12 Channels, one suggested Channel capacity would be four balls for all Channels, allowing a Ring wager to have the same odds as a 3-Channel wager—with the Ring and the three specific Channels each containing 12 balls. This structure reduces potential confusion by establishing common odds and allowing players to see the parallels between Ring and Multiple Channel wagers, with the Channel wagers corresponding to location on the “Game Wheel” and the Ring wagers acting as a function of timing.

Ring wagers are a quick and easy decision to make, and just like Multiple Channel wagers, may be placed for each ball “Type”. Unlike Multiple Channel wagers, there are far fewer selections, consisting of each available Ring (A through D in the four ball Channel capacity example) for each ball “Type”. This may easily be expressed in a betting matrix with the ball “Types” on one axis and the Ring “Identifiers” on the other. The odds would be common across all Rings in this example (all Rings have the same Channel capacity) and would be based upon the distribution of each ball “Type”.

Ring wagers serve as a transition wager for players who are not yet comfortable placing Multiple Channel wagers. They offer players the ability to make the equivalent of a 2-Channel wager (or a 3-Channel wager in a 12 Channel, four ball Channel capacity game) without having to individually select Multiple Channels from the available Channels. Further, this wager appeals to players who believe that the balls will fill the Channels in a certain order based upon timing, perhaps with a greater distribution of their desired ball “Type” towards the beginning, middle, or end of the round of game play. Players favoring earlier distribution would likely wager on the A-Ring being filled with their desired ball “Type” first, while players believing that their desired ball “Type” will be the last to fill the Channels are most likely to wager on the innermost (typically D or E) Ring.

By minimizing complexity and offering a method of wagering more closely associated with time rather than location, Ring wagers typically offer an additional four to five betting opportunities for each available ball “Type”. As players begin to place and reap the rewards associated with Ring wagers, their confidence will continue to grow, and they’ll be more likely to explore bets offering similar odds with far more wagering opportunities, typically in the form of Multiple Channel wagers.

(E) Specified Winning Event Within the “Wheel Center”—This is a more specific wager allowing players to select the center of the “Game Wheel” where they believe the distribution of a chosen particular ball “Type” will fall short of or exceed the expected distribution outcome. This outcome may be described as a Disproportionate Distribution of a Particular Ball “Type” within the “Wheel Center”. Depending upon the total number of available balls and the total Channel holding capacity, the quantity of balls remaining in the “Wheel Center” at the end of the round may be less than, equal to, or greater than the capacity of one or more Channels—or there may be no “left-over” balls whatsoever (the total number of available balls and Channel holding capacities are identical).

In deployments in which there are only a few “left-over” balls occupying the “Wheel Center” at the end of the round (typically fewer than the capacity of a single Channel—i.e. if the common Channel capacity is four balls, the “Wheel Center” may contain three, two, or one “left-over” balls), players may be presented with a number of high-risk, high-payout wagering opportunities, some of which may result in the triggering of a high-value Bonus Event upon a winning outcome.

For example, in an eight Channel, four ball Channel capacity game with 35 total balls in play, three balls will remain in the “Wheel Center” at the end of each round. In this example, if there is only one gold ball in play, the chances of the gold ball being one of the three “left-over” balls in the “Wheel Center” is 8.57% (a 1 in 11.67 chance), easily allowing for a potential 10-to-1 payout per credit wagered at an 85.71% return rate. Furthermore, if two silver balls are also in play, the chances for any combination of two of the three balls (one gold and two silver) remaining “left over” in the “Wheel Center” is 1.47% (a 1 in 68.18 chance), which may result in the triggering of a Bonus Event with a potential 60-to-1 payout per credit wagered at an 88% return rate.

Deployments in which there are a significant number of “left-over” balls remaining in the “Wheel Center” at the end of the round are geared more towards games emphasizing Channel, Multiple Channel, and Ring wagers in which there is a sufficient quantity of each ball “Type” to completely fill one or more Channels or Rings. This allows for some rather exotic wagering scenarios, including “Over”, “Under”, and “Over OR Under” wagers on the quantity of each particular ball “Type” remaining “left over” in the “Wheel Center”.

For example, in an eight Channel, four ball Channel capacity game with 20 available balls for each of three ball “Types” (60 total balls) in play, there will be 28 “left-over” balls remaining in the Wheel Center” at the end of each round. In this example, if there are 20 balls of each “Type” Red, White, and Blue, the chances of seven or fewer balls of any one of the three particular ball “Types” (Red, White, or Blue) being among the 28 “left-over” balls remaining in the “Wheel Center” are 15.72% (a 1 in 6.36 chance). Similarly, the chances of 12 or more balls of any one of the three particular ball “Types” being among the 28 “left-over” balls remaining in the “Wheel Center” are 11.72% (a 1 in 8.54 chance). Furthermore, the chances of LESS THAN seven (0-6) or MORE THAN 12 (13-20) balls of any one of the three particular ball “Types” being among the 28 “left-over” balls remaining in the “Wheel Center” are 9.99% (a 1 in 10.01 chance).

The odds of achieving any of these outcomes are certainly reasonable, however, the real excitement for players stems from the range of payouts available for achieving low probability outcomes. In other words, players may be awarded several credits for each credit wagered if they achieve the highest probability winning outcome (i.e. 6-7 balls in a “Seven or Less” wager), while the lowest probability outcomes (i.e. 1 or NO balls in a “Seven or Less” wager) may result in significantly higher awards per credit wagered. The ability to offer a relatively “common” winning event with the potential for “uncommon” awards, through achieving low-probability results in order to generate the winning event, is a tremendous motivator for players. Winning events will most often be the highest-probability winning outcomes, however, the possibility for the outcome to result in a low-probability, high-yield award (while adhering to casino desired return rates and holds) encourages players to continue wagering in hopes that their next win will indeed be the “big one”.

Deployments in which the number of “left-over” balls remaining in the “Wheel Center” at the end of the round is exactly the SAME as the number of balls in a single Channel are geared towards games in which the “Wheel Center” is treated in the same manner as a Channel—same capacity, same odds, etc. In certain game variations, it may be used as a comparative function, most often representing an opponent or the “Dealer”, in which case the “value” of the contents of the player’s selected Channel is measured against the “value” of the contents of the “Wheel Center” and a final winning determination is made based upon the outcome of the comparison.

The simplest deployment consists of a “Game Wheel” with a Channel capacity that exactly meets or even exceeds the total number of balls in play, resulting in NO “left-over” balls remaining in the “Wheel Center” at the end of the round. Naturally, with no “left-over” balls remaining, there are no apparent wagering opportunities for the distribution of balls within the “Wheel Center”.

(F) Proposition Wagers—This feature allows various deployments of the “Spin Game” to select from a pool of specific Proposition Wagers on the outcome of various events throughout the course of game play in order to reward players with additional wagering opportunities (often resulting in Bonus Events) for exceeding a particular wagering threshold (quantity and/or total value of wagers) in a round, extended play sessions, etc. In addition to the intended function of rewarding players for their wagering level and duration of game play, Proposition Wagers (“Props”) also serve to invigorate the game by routinely updating a portion of the Betting Area with new and diverse bets beyond the standard Channel, Multiple Channel, Ring, and “Wheel Center” wagers. Randomly occurring Proposition Wagers may also be offered to entice players to increase the duration of the gaming session in the hopes of being offered “uncommon” Proposition Wagers that typically result in a “better than average” chance of success.

Imagine if Roulette allowed players to wager that the outcome of the next five spins would favor a particular color, with scaled payouts for a color match of 3, 4, and 5 spins. Naturally, this type of wager is prohibitive in Roulette as it would require the bet to remain in play for a minimum of three and a maximum of five rounds of game play. Since Roulette relies upon a single ball landing in a specific number and color combination space, additional wagering opportunities are few and limited. However the “Spin Game” may utilize multiple balls of varying “Types” with numerous individually addressable landing spaces. Proposition Wager opportunities are virtually limitless with easily configurable durations including both single round as well as multiple rounds of game play. In most cases, however, Proposition Wagers typically conclude after a single round of game play.

Proposition Wager bonuses and/or bonus wagers may be made available based upon the fill order of a particular ball “Type” within a selected Channel (i.e. filled with a red ball first, last, or first and last), sequential order of a particular ball “Type” within a selected Channel or Ring (i.e. two, three, or four red balls in sequence [all touching]), combinations of multiple ball “Types” within a selected Channel (i.e. one red, white, blue, green, and gold ball in a Channel or Ring, or “NO duplicates” [all balls in a Channel are different “Types”]), etc. Proposition Wagers may also include unique distributions and/or patterns for Individual or Multiple Channels or Rings.

For example, a Proposition Wager may offer a 2-to-1 payout if there are more white balls than red balls in Ring A. This particular “Prop” may be very appealing to some players as it doesn’t require a specific threshold number of a particular ball “Type” to occupy Ring A, but instead, simply more of one "Type" of ball than another. Theoretically, the player could win just with a single white ball in Ring A if there are NO red balls in Ring A.

The odds and payouts for each Proposition Wager in the pool are carefully calculated to maintain the desired house edge. Some "Props" may be more advantageous to the player than others, and some may even significantly favor the House. Regardless, it is up to the players to decide if they wish to take advantage of one more offered "Props" each round, knowing that the next round of game play may offer a completely different set of "Props" or even NO "Props" at all.

The use of Proposition Wagers adds yet another dimension to "Party Style" deployments, allowing multiple players to participate in the same "Prop" with the size of the award based directly upon player participation. In other words, the more players that accept the "Prop", the larger the potential payout award. Certain deployments may be networked across multiple casinos, allowing for "wide-area" play with the potential for hundreds of players to participate together. If desired, a video "leader board" may also be employed, allowing players to uniquely identify themselves via initials, name, nickname, "handle", etc. to compete with other players for the highest overall win (typically total won less total bet) for each round of game play and/or play session. Competition may be friendly for bragging rights or competitive for additional bonuses to be awarded based upon "leader board" standings after a specific number of rounds or time period of game play.

Tournament play may also be engaged, allowing players to select from multiple wagering options rather than simply pressing the "Max Bet" button repeatedly as is common practice in Slot Tournaments. By varying their wagers among the available options, players become more active participants in "Spin Game" Tournaments, developing strategies for play which may indeed prove to be more successful than simply placing random wagers. This certainly promotes the desire for players to sharpen their gaming edge by participating in more "Spin Game" Tournaments as well as practicing on normal "Spin Game" consoles to experiment with various wagering strategies and optimize the time they spend placing their wagers for maximum impact.

(G) Bonus Events—This is a feature that allows players to participate in a Bonus Round or Event triggered by the successful outcome of a wager. Wagers resulting in the award of a Bonus Event may include, but are not limited to, ball "Type" distributions and/or combinations within Individual or Multiple Channels, Rings, or the "Wheel Center", as well as Propositional Wagers. The potential value of a Bonus Event may be static or more often, based upon the value of the wager placed that triggered the Bonus Event and/or the measure of "success" of the wager in triggering the Bonus Event—the qualifications for triggering the Bonus Event in the wager were met, slightly exceeded, or even significantly exceeded.

In a prior example in which three balls remained in the "Wheel Center" at the end of the round, and among the ball "Types" in play were two silver and one gold ball, a potential Bonus Event triggering wager may be offered if the single gold or two or more of these three balls remain in the "Wheel Center" at the end of the round of game play. Additionally, in order to achieve the Bonus Event for such a success, a minimum wager may be required, otherwise, the resulting payout may simply be an odds calculated value.

Further, the potential value of the Bonus Event may be influenced by the value bet in excess of the minimum wager required to trigger the Bonus Event, which may be often implemented as a form of multiplier—i.e. players wagering twice the minimum required wager may have their Bonus Event winnings doubled. The potential value of the Bonus Event (prior to the influence of the value of the wager that trigger the Bonus Event) may also be affected by the distribution of the balls remaining in the "Wheel Center", with scaled increases in value based upon the odds of achieving the most common to the rarest results—i.e. one gold ball or a silver and gold ball would be more common, while two silver balls or both silver and the gold ball together in the "Wheel Center" would be rarer combinations and subsequently trigger more valuable Bonus Events. Actual Bonus Events triggered may vary by deployment, however, for the purpose of description, a sample Bonus Round will be detailed, and should in no way be regarded as limiting.

Upon the successful triggering of a Bonus Event, players are presented with a Bonus Round "Game Wheel", typically employing the same number of Channels, Rings, and Channel capacities as the "Spin Game" they were playing that launched the Bonus Event. While the number of Channels, Rings, and the Channel capacities may be different than the game they were playing, it is generally recommended that the Bonus Round "Game Wheel" match the layout of the game in order to prevent potential confusion. The Bonus Round ball "Types" in play may be identified with numerical representations indicating the credit value associated with each ball. Similarly, colored ball "Types" may instead be used, with each color corresponding to a specific credit value—smaller distribution colors having a larger intrinsic credit value than the more commonly distributed colors. Credit value and/or color distribution of the ball types may be influenced by the value of the wager triggering the Bonus Event and/or the ranking of the distribution of the ball "Types" that triggered the Bonus Event. Logically, larger Bonus Event triggering wagers and rarer (less common) Bonus Event triggering distributions typically result in higher credit value ball "Types" and/or a more favorable distribution of higher credit value ball "Type" colors.

The Betting Area is updated to reflect the new Bonus Round "Game Wheel" and ball "Type" layout, and players are instructed to select one or more Channels and/or Rings based upon the value of their wager that triggered the Bonus Event. The option exists to allow Bonus Event triggering wagers beyond the qualification threshold to act as a multiplier and/or to allow players to select more potential winning opportunities within the Bonus Event itself.

For example, in an eight Channel, four ball Channel capacity game, a Bonus Event triggering wager placed at the minimum qualification threshold may allow the player to select a single Channel (4 balls total) within the Bonus Event itself, while successively larger Bonus Event triggering wagers may result in the player being allowed to select either two Channels or one Ring (8 balls total), three Channels or one Channel and one Ring (12 balls total), and at the maximum allowable wager, four Channels or Two rings, or Two Channels and one Ring (16 balls total). Some deployments may allow players to select individual ball locations from a Channel and Ring diagram displayed to allow for precise selection of exact landing spaces or "Sockets" within the Channels and Rings. However, this approach is best reserved for games employing fewer Channels and Rings with smaller Channel capacities to avoid potentially overwhelming the players.

Upon selection of the Bonus Event Channel(s) and/or Ring(s), the Bonus Round "Game Wheel" is spun and the balls are distributed throughout the Channels and Rings. At the end of the Bonus Round, the credit values of those balls residing in the Channel(s) and/or Ring(s) selected by the player are totaled and awarded. Given that Bonus Events are generally awards, under most circumstances players will not experience negative outcomes—typically the worst case scenario would result in the player receiving the minimum Bonus Event value for obtaining the lowest credit value balls in their selected Channel(s) and/or Ring(s). Certain deployments may employ "Zero" credit value balls and/or fewer balls than the total Channel capacity of the Bonus Round "Game Wheel", thereby resulting in some Channels remaining only partially filled or possibly even completely empty.

While Bonus Events may be implemented in standalone EGMs, they are certainly most prodigious when employed in "Party Style" and/or networked deployments. With multiple players participating in the same Bonus Event, option arise such as awarding additional Bonuses within the Bonus Event itself for achieving the highest value Bonus Event rankings among all participating players. This ranking system is a strong motivator among players and often encourages significantly increased participation in Bonus Event triggering wagers for the opportunity to participate in the communal Bonus Round Event with the hopes of acquiring top ranking along with a handsome payout.

In order to maintain an even standing among players in a communal Bonus Round Event, it is suggested that the distribution of the ball "Types" in the Bonus Event triggering wager determine the number of Channels and/or Rings to be selected, with the rarer distributions resulting in increased Channel and Ring selections. Since the credit values of the wagers triggering the Bonus Event may vary among the participating players, it is suggested that in this case that values bet in excess of the minimum qualification be used to determine a multiplier value to be applied to the final valuation of each player's Bonus Event totals. In some cases, based upon random timing, total credits wagered, rounds played over a period of time, or other randomly definable thresholds, the "Spin Game" may elect to award a complimentary Bonus Event to all players who participated in the last round of game play. These "Out of the Blue" complimentary Bonus Events encourage players to increase the duration of their play sessions, as well as take advantage of Bonus Event triggering wagers, in the hopes of achieving participation in the potentially highly lucrative Bonus Events.

The Betting Area may be displayed graphically as a matrix in which the available ball "Types" and the Channels, Rings, and the "Wheel Center" intersect to allow for an easy-to-read odds/payouts display and simple to use wagering functionality. This style of layout is used quite successfully in the popular table games of Roulette and Craps in which both common and uncommon bets are openly displayed on the felt (or electronically in EGMs) and easily facilitated.

Since certain wagers require the selection of Multiple Channels, a method of allowing players to customize their wagers by selecting their desired Channels and updating the Betting Area accordingly may be employed. If a more static and less customized approach is preferred, the selection of Channels for Multiple Channel wagers may be limited to a predefined array, which may include neighboring Channels, Channels opposite one another on the "Game Wheel", Channels located a specific "distance" apart from one another, and/or Odd or Even numbered Channels (Vowels or Consonants, etc.). A consecutive, sequential group of neighboring Channels may be referred to as a "Segment", while a non-sequential group of Channels separated by one or more Channels (Opposing, Odds, Evens, Vowels, Consonants, etc.) may be referred to as a "Series".

For example, a 2-Channel wager in an eight Channel game may specify Channels 1-2, 3-4, 5-6, and 7-8, as predefined, neighboring Channel "Segment" wagers, as well as Channels [1 & 5], [2 & 6], [3 & 7], and [4 & 8] as opposing Channel "Series" wagers.

Similarly, a 3-Channel wager in a 12 Channel game may specify channels 1-3, 4-6, 7-9, and 10-12, as predefined, sequential neighboring Channel "Segment" wagers, as well as Channels [1, 5, & 9], [2, 6, & 10], [3, 7, & 11], and [4, 8, & 12] as predefined, non-sequential Channel "Series" wagers with Channels located a specific "distance" apart from one another—all are equidistantly located 120-degrees from one another, similar to the numbers on the face of a clock.

To better facilitate placement of their wagers, player may be presented with a graphic representation of the "Game Wheel" to more easily and accurately identify and select their desired Channels, Rings, "Wheel Center", "Segment", "Series", etc. wagers. Key to the success of the game is for players to easily manage and understand their wagers, as well as know exactly when they have won or lost. Given that vast number of potential wagers available, this is most easily facilitated by employing a Wagering Matrix display which may be updated in real-time as the balls begin to fill the Channels and Rings. As each new ball enters a Channel, the Wagering Matrix is updated.

All possible winning combinations within the Wagering Matrix are highlighted as their specific requirements are met (whether players have wagered upon them or not), enabling players to view all resulting winning combinations and the return per credit wagered they would have won had they elected to make that particular wager. Winning combinations that players have actually wagered upon are significantly highlighted, informing players of what they have actually won by the end of the round of game play.

By highlighting all possible winning combinations while significantly highlighting the winning wagers actually placed by the players, the possibility for confusion over wins and losses is dramatically reduced, and players are presented with a view of all the potential wins they could have received had they wagered differently. This can serve as a highly motivational inducement for players to place additional concurrent wagers to further increase their odds of winning, as well as contribute significantly to increased play by players who tend to wager upon trends and patterns.

A scrollable list of Wagering Matrices from prior games may be maintained to allow players to scan through the last [X] number of games to evaluate perceived trends and patterns upon which they may elect to wager. A selection button may be made available to automatically highlight the most frequent winning wagers of the last [X] number of games on the Wagering Matrix of the current game, allowing players to quickly wager on perceived prior winning trends and patterns. Naturally, the outcome of each game is completely independent of prior outcomes; however, trend and pattern watching are common beliefs among many players as evidenced by the abundance of Roulette winning number history displays in use in casinos today.

Depending upon the deployment, some of the Wagering Matrix information in the Betting Area may alternately appear in the Status and Information Area described below. While some of the information may be common and shared between both Areas, the primary differentiator between the two is the Betting Area serves as the key point of player interaction with the game, while the Status and Information Area serves mainly as a reporting tool of wagers placed, won, and lost. There is certain to be some overlapping functionality and the Status and Information Area may even offer some form of player interaction such as selecting a wager to repeat or modify for the next round of game play, or cancel and remove completely. Ideally, the quantity and complexity of the available wagers in the game will determine the degree of separation between both areas—games with fewer, simple wagers available may combine the Betting Area and Status and Information Area into a single graphic display, while games offering a significant number of wagers, including customized and/or complex wagers, may best be served by a clear and defined separation between the Betting Area and Status and Information Area.

(4) The Status and Information Area is updated throughout the course of game play and reports important information to players, including but not limited to the wagers they have placed along with real-time updates of the fulfillment of their wagers, thereby heightening their gaming experience and better facilitating wager modifications as well as repeat wagers for upcoming rounds of game play. The Status and Information Area may be integrated directly into the Betting Area or displayed separately in close proximity to the Betting Area. The purpose of this area is to provide the player with an easy-to-read overview of their wagers placed before, during, and after each round of game play. Players may utilize this area to add, verify, modify, repeat, and/or cancel or remove desired wagers prior to each round of game play.

During game play, each active wager listed is updated to display the wager's specific results as the balls fill each of the available Channels, Rings, and the "Wheel Center". By the end of the round, each wager listed displays the value won (if any) as well as the total amounts wagered and won for all wagers placed in that round of game play. Before the next round of game play begins, (providing players have enough credits to cover the cost of their wagers) players are offered the opportunity to repeat the same wagers from the previous round, modify them, and/or cancel or remove them on an individual basis, or clear all wagers completely. This is a highly useful feature, as some players may tend to repeat wagers that have resulted in prior winning outcomes while others may elect to repeat wagers that have consistently failed in achieving a winning outcome, believing that such an outcome is "overdue" (despite the fact that future outcomes are completely independent of prior outcomes).

While players may choose to completely clear all wagers after each round of game play and place new wagers, more often than not they tend to be "creatures of habit", electing to develop and test a wagering strategy and sticking with it for multiple rounds of game play until such time as they decide to try a different wagering theory. By allowing players to maintain and modify their wagers between rounds (in addition to adding and removing wagers), a significant increase in the speed of wager placement is achieved along with an elevated number of concurrent wagers placed as players add additional wagers to their "Wager List" and take full advantage of desired Proposition Wagers in the hopes of triggering a Bonus Event. In addition to the "Wagers List", the Status and Information Area may also display standard game data including but not limited to credit value, credits available (player bankroll), total credits wagered, credits won for each wager, total credits won, etc.

A highly unique element of the Status and Information Area is the graphic display of the corresponding ball "Types" that fill each Channel and Ring, as well as the left-over ball "Types" remaining in the "Wheel Center" (if any) for each active wager.

For example, a single Channel wager in an eight Channel game, with each Channel having a four ball capacity, would display a graphic representation of the four available ball "Sockets" within the selected Channel directly next to the wager. For the purposes of this example, the Channel will be identified as #5 of the available eight Channels, and the success requirement of the wager is that the Channel will contain two or more white balls.

This wager information is displayed graphically in the "Wager List", indicating the Channel Identifier—in this case Channel #5—(game variations may use any form of Channel Identifier including but not limited to letters, numbers, symbols, pictures, names, etc.), the ball "Type"—in this case white—the requirements for the wager to be deemed successful—2+ (two or more) white balls in the specified Channel—the payout odds for meeting or exceeding the wager requirements—a payout of 2-to-1 credits—the amount of credits wagered—10 credits—the amount won (which will be filled in by the end of the round of game play if the wager results in a successful outcome), and a representation of the four ball "Sockets" within Channel #5 that will be filled during the course of game play (presently empty placeholders).

When the "Game Wheel" is spun and the Channels begin to fill, the wager placed on Channel #5 is updated in real-time as each ball enters that specific Channel. If the first ball that enters Channel #5 is red, the representation of the four ball "Sockets" within Channel #5 updates to show a red ball in the fourth or last "Socket" position (since the Channels fill from outermost to innermost "Socket" positions, the first ball to fill the Channel is the furthest away from the "Wheel Center", so the representation would fill from right to left or bottom to top, depending upon the orientation of the graphic representation). Continuing the process, if the second ball to enter Channel #5 is white, the representation of the four ball "Sockets" within Channel #5 updates to show a white ball in the third "Socket" position, and since this particular ball "Type" is part of the requirement that results in the success of the wager, it is highlighted appropriately, and the wager is updated to display that only one additional white ball is necessary to successfully meet the requirements of the wager. If the next ball to enter Channel #5 is white, the representation of the four ball "Sockets" within Channel #5 updates to show a white ball in the second "Socket" position, and since this particular ball "Type" satisfies the wager requirements, it is highlighted appropriately, the wager is updated to display a successful completion of the wager requirements, and the total credits won is updated based upon the wager (in this case, 10 credits wagered with 2-to-1 payout odds results in a 20 credit award).

In certain deployments, a bonus may be awarded for exceeding the requirements of the wager. In such cases, if the last ball to enter Channel #5 is white, the representation of the four ball "Sockets" within Channel #5 updates to show a white ball in the first "Socket" position, and since this particular ball "Type" EXCEEDS the requirement that results in the success of the wager, it is highlighted appropriately, and the wager is updated to display a successful completion BEYOND the wager requirements, and the total credits won is updated to include a specified Bonus award which may include but is not limited to a specific number or percentage of credits based upon the value of the credits wagered, a portion or share of a credit "pool" resulting from wagers accumulated on one or more specified ball "Types" (i.e. a portion of the wagers placed on the same ball "Type" [white] that did not result in a winning event in other Channels or a portion of the wagers placed on the same Channel [#5] for other ball "Types" that did not result in a winning event), a portion or share of one or more progressive jackpots, and/or the triggering of Bound Event.

For Multiple Channel, Ring, and "Wheel Center" wagers, the process remains the same with the key difference being the graphic representation of the ball "Sockets". Multiple Channel wagers would display graphic representations of ball "Sockets" for each Channel included in the wager.

For example, a 3-Channel wager in an eight Channel game, with each Channel having a four ball capacity, would display a graphic representation of the four available ball "Sockets" within each of the three specified Channels directly next to the wager.

Given that Ring wagers are based upon the placement of balls in the same "Socket" position across all available Channels, graphic representations for Ring wagers would be most practically served by using either a "pearl necklace" style of display, with each "pearl" representing the contents of the same "Socket" across all corresponding Channels, or a grid/spreadsheet displaying the Channel Identifier and corresponding "Socket" for all available Channels in the specified Ring wager. Based upon our prior example, there would be four Ring wagers available for each ball "Type", each containing eight balls, one ball per Channel in the same corresponding "Socket" position, representing the fill order—the outermost (fourth "Socket", first to fill—Ring A), third "Socket" (Ring B), second "Socket" (Ring C), and innermost (first "Socket", last to fill—Ring D).

Given that "Wheel Center" wagers are based upon the quantity of one or more ball "Types" remaining in the center of the wheel at the end of a round of game play, the graphic representations for "Wheel Center" wagers may be as simple as displaying the balls that are "left over" at the end of the round (typically for deployments in which there are 12 or fewer balls remaining in the "Wheel Center" at the end of game play), or more complex in the form of a grid/spreadsheet displaying all ball "Types" and a numeric quantity for each ball "Type" remaining in the "Wheel Center" (typically for deployments in which a significant number of balls will remain in the center of the wheel—far too many to easily display—possibly even more than the combined capacity of all Channels).

Proposition wagers will employ a similar graphic representation which most easily identifies the ongoing updates towards the success or failure of the Proposition. In other words, if the "Prop." is geared towards the contents of one or more Channels, the Channel graphic representation will most likely be used. Similarly, those Proposition wagers focused upon the contents of Rings and/or the "Wheel Center" will utilize their respective graphic representations. Certain Proposition Wagers, however, may venture beyond the realm of Channel, Ring, and "Wheel Center" wagers and require customized graphic representations to illustrate the progress and success or failure of the "Pro" p.

(5) Game Variations may include modifications made to the "Game Wheel", Channels and Rings, Ball "Types" and Quantities, as well as the Betting Area and Status and Information Area to adapt the "Spin Game" to a specific set of desired rules including but not limited to those associated with table games employing cards, dices, tiles, balls, etc.

In its most basic form, the "Spin Game" may be used an alternate method of playing traditional Roulette. The "Game Wheel" may be structured in a 37 or 38 Channel (0 or 00 style) deployment (each Channel having a one ball capacity), with a single ball (one ball "Type" with a quantity of one) residing in the "Wheel Center". Wagers would be placed, the "Game Wheel" would be "spun up" to speed, and the ball would be forced into one of the available Channels.

Aside from a novel approach to playing Roulette in the opposite direction—a "Reverse Roulette™" variation—a key benefit to this approach is the ability to significantly increase the rate of game play. Rather than waiting for gravity to pull the ball to the center of a traditional Roulette wheel, specifying how fast the "Spin Game" Roulette variant "Game Wheel" rotates and increases in momentum results in a tremendous measure of control over the length of time it takes for the ball to land. Casinos may significantly capitalize on a consistently attainable, desired number of games per minute target goal for each "Reverse Roulette™" (or "Speed Roulette™") deployment.

Further, as a security measure against players who may somehow acquire an unfair advantage playing traditional Roulette, typically through accidental mistakes in protocol made by the croupier and/or equipment issues and malfunctions resulting in above average winning results for a specific group of numbers on the Roulette wheel, the "Spin Game" Roulette variant may easily eliminate these issues by randomly adjusting the rate of speed of the wheel differently each and every game or constantly throughout the course of game play. The casino may elect to allow the wheel to turn slowly at first, allowing the ball to move freely around at the "Wheel Center" for a predetermined amount of time while players place their wagers, followed by a designated rate of increase in the speed of rotation ranging from relatively slow, allowing the ball to bounce around the wheel a bit for more action and excitement, to extremely fast, forcing the ball into a nearly instantaneous landing in one of the Channels. It is suggested that some wheel motion be applied to keep the ball moving in the "Wheel Center" throughout the wagering process, as many players are accustomed to carefully observing the speed of rotation of both the wheel and the ball around the traditional Roulette wheel in hopes of gauging where to place their bets. The motion during the wagering process will provide this stimulus as well as a heightened level of excitement.

Counter rotating "Wheel Sections" (which may contain peaks and valleys) within the "Wheel Center" may further randomize the motion of the ball. A count-down timer may be displayed, indicating the point at which "No More Bets" will be accepted—thereby allowing the casino precise control over the timing of the betting cycle and number of games per minute—and at that moment the croupier triggers the "Game Wheel" to begin its randomly selected rate of increase in rotational speed until such time as the ball is forced into one of the available Channels.

To further increase the speed of the payout process, as well as add an additional layer of security to eliminate potential payout errors, each Channel on the "Game Wheel" may be outfitted with a radio-frequency identification (RFID) or similar technology sensor to pickup the location of the ball and light-up all resulting winning outcomes on the Betting Area. The remaining unsuccessful wagers are cleared, the winners are paid, the ball is returned to the "Wheel Center", and the process begins anew.

Naturally, this description is for a combined electro-mechanical version of "Reverse Roulette™" (or "Speed Roulette™") to be used in conjunction with or as a replacement for traditional Roulette table games. A completely electronic, EGM Roulette variant may also be deployed, and this description should in no way be regarded as limiting.

Game Play Variations of traditional Roulette may also be explored, such as using two or more balls and/or varying the number and capacity of the Channels. For example, consider the possibility of a Roulette variant that employs two balls (same "Type", quantity of two balls) with each Channel having a two ball capacity. New wagers such as One Red/One Black, Both Red, Both Black, One Odd/One Even, Both Odd, Both Even, etc. become available. Further, a progressive wager option may be offered rewarding players if both balls land on the same number—completely filling a single, two ball capacity Channel. Nearly limitless possibilities exist for reinventing the traditional Roulette game, as well as increasing the security and speed of play and payout.

The "Spin Game" may also be structured to require a specific arrangement or orientation of the ball "Types" collected in a Channel, Ring, "Segment", or "Series" in order for players to be eligible to receive a payout or bonus. For example, if a four ball capacity Channel contains either two or three balls of a particular "Type", payouts may be dependent upon whether all the balls of the same "Type" are touching one another. This sequential orientation may be required for any payout, a bonus payout, or not at all.

The "Spin Game" may also employ Channels of "Varying Capacities" within the same game. In other words, a game with a maximum Channel capacity of four balls may also employ Channels with a capacity of three balls, two balls, or even a single ball. This is most easily accomplished by shortening the length of the Channel from the outermost ring inwards, thereby reducing the capacity of a specific Channel. For example, a Channel capacity of three balls may be attained by "blocking" the outermost "Socket" in the desired Channel of a four ball maximum capacity Channel. A Channel capacity of one ball may be attained by "blocking" all but the innermost "Socket" in the desired Channel of a four ball maximum capacity Channel. Employing channels of "Varying Capacities" within the same game may be used to better facilitate the implementation of complex games in which differing numbers of "objects" (such as cards, dice, tiles, balls, etc.) are required for play, as well as to vary the number of balls available for specific Channel and Ring wagers to achieve a desired set of odds.

The "Spin Game" is well suited to "Party Style" deployments, in which wagering consoles are arranged around a central monitor or monitor bank. In addition to the "Game Wheel" being displayed on the central monitor, additional monitors may display the wagers that players are placing in real time from their individual terminals in a communal fashion, thereby enticing other players to place similar wagers along with or directly against their wagered outcomes (similar to Craps and Roulette in which players may wager on the same or opposing outcomes). This feature contributes significantly to the party atmosphere of the game, as players may win together or be on opposing sides of a wager in which one player wins while another loses based on the outcome of that specific wager.

"Party Style" Bonus Events may be offered on specific wager outcomes and/or Proposition wagers offered to all participating players, as well as being triggered by meeting specific threshold requirements (such as total or consecutive rounds played, credits wagered, won, lost, etc. by each participating player) or even on a completely randomly occurring basis (such as "Out of the Blue" complimentary Bonus Events). Players meeting the criteria for participation in the Bonus Event (i.e. achieving a specified outcome, accepting and winning a Proposition wager, or even simply having met or exceeded the wagering threshold in the round of game play that triggers the Bonus Event) have the opportunity to participate in the Community Bonus Round.

Community Bonus Rounds may be similarly structured to Bonus Rounds offered in individual console EGM deployments with the addition of competition among Bonus Round participants to achieve the highest Bonus Event value. Additional Bonus credits may also be awarded based upon the "ranking" of the top Bonus Event values achieved among participating Community Bonus Round players. Progressive Jackpots may also be awarded and/or shared among players achieving uncommonly rare results within the Bonus Round.

When a Community Bonus Event occurs, the execution is nothing short of spectacular. The central monitor display bank virtually erupts with exciting graphics, lights, and video denoting the launch of the Bonus Event. The wagering terminals of players' fortunate enough to participate in the event display similar graphics, lights, and video with a triumphant audio message indicating their award of participation in the Community Bonus Round with instructions of how to proceed.

Players make their Community Bonus Round selections, which also appear on the central monitor display bank. A count-down timer may also be employed to ensure the Community Bonus Round is executed and completed within a specific time frame. Participating players unable to make their selections before the end of the count-down may have their selections picked randomly, receive the same selections as another randomly selected participating player, or receive the same bonus award value as the lowest participating player. During the Community Bonus Round, as the balls fill the Channels and Rings, the corresponding value of each player's selections is updated on their individual wagering terminal as well as on the central monitor display bank. Player rankings are adjusted in real-time until such time as the Community Bonus Round is completed. At the end of the Community Bonus Round, players are awarded their Bonus Round total credit values based upon the outcome of their selections, as well as any additional bonuses received based upon their "Leader Board" ranking and/or potential entitlement to a share of one or more Progressive Jackpots. Wagering terminals of players who participated in the Community Bonus Round are returned to their normal appearance for the next round of standard game play to begin. Given the nearly overwhelming sensory experience and typically high credit value awards associated with Community Bonus Rounds, players are significantly motivated to participate in those wagers having the potential of awarding a Community Bonus Round upon successful completion.

The basic concept and "mechanics" behind the "Spin Game" may also be used in a variety of different game variations by simply altering the "Style" of the balls. For example, the balls may be marked with the numbers one through six, allowing a variety of dice games to be played such as (A) Sic-Bo, (B) Dice Poker, and (C) Craps. Balls may also be marked with card values and suits, allowing a variety of card games to be played including many popular (D) Poker Variations and with some modifications (E) Other Card Games including Blackjack and Baccarat. The "Game Wheel" itself may also be "themed", resulting in a multitude of Game Theme Variations described in greater detail in the following "Game Theme" section.

(A) Sic-Bo Variations—Since the traditional game of Sic-Bo is played with three six-sided dice, a total of 18 balls would be recommended for this variation—three "ball sets", with each individual ball marked with a value from one to six contained in each set—resulting in six ball "Types" (marked 1-6) with a quantity of three of each ball "Type". Three dice values are required for the game of Sic-Bo, so a total of six Channels, each with a three ball capacity, would meet the game play requirements. This would allow for six concurrent games of traditional Sic-Bo to be played simultaneously. Standard Sic-Bo wagers may be applied to each of the six Channels. This particular "Game Wheel" layout would also result in the creation of three Rings, each containing six balls. Additional Ring wagers may be offered as well, similar in nature to traditional Sic-Bo bets, however, taking into consideration that each Ring contains six "dice" values rather than the traditional three.

The Sic-Bo Variation may be further expanded by adding additional "ball sets" (increasing the quantity of each ball "Type" [1-6] from three, to four, five, six, etc.), thereby increasing the number of Channels and the quantity of balls contained in each of the three Rings by a factor of two for each additional “ball set” added. For example, increasing the number of “ball sets” from three to four would result in 24 total balls, requiring eight Channels. A total of eight concurrent Sic-Bo games may be played simultaneously, and each of the three Rings would contain eight balls. Additional “ball sets” may be added ad infinitum, depending upon the number of concurrent Sic-Bo games the casino desires to offer players for simultaneous play. However, careful consideration should be given in determining the number of “ball sets” in a deployment given their significant impact upon the quantity of balls that will be contained in each of the three Rings.

If a reduction in the number of Channels, or the quantity of balls in each Ring is desired, the “Wheel Center” may be utilized as an “overflow” container. In other words, using the three “ball set” example above, if the number of Channels is reduced from six to five, 15 of the 18 balls will completely fill the capacity of all five available Channels leaving an “overflow” of three balls remaining in the “Wheel Center” at the end of the round. The left-over balls remaining in the “Wheel Center” may also be used for traditional Sic-Bo wagers as well; however in this case, they would not contribute to the “value” of any of the Rings as their final position is the “overflow” within the “Wheel Center” and not in a “Socket” corresponding to any of the three Rings. This scenario is most often employed when comparative wagers are desired—such as Player vs. Dealer wagers in which the “value” of a player selected Channel is compared against the value of the “Wheel Center” (representing the Dealer) in order to determine the outcome of the wager.

Further, the number of balls in each Ring has now been reduced from six to five. This opens up the possibility of offering a completely different set of wagering options based upon five balls, such as “Dice Poker”— see (B) Dice Poker Variations below—which may offer a variety of wagering opportunities including but not limited to “low” pair, “high” pair, two pair, three-of-a-kind, a straight, a full house, four-of-a-kind, and/or five-of-a-kind.

Higher, lower, and matching value comparative wagers may also be offered for each Channel which may pay if the combined “numerical” value of the numbered balls in the selected Channel is higher, lower, or matches (ties) the combined “numerical” value of the numbered balls remaining in the “Wheel Center”, or if one, two, or all three numbered balls match the numbered balls remaining in the “Wheel Center”. With virtually limitless configurations, concurrent play of multiple games simultaneously, and the options of standalone single player as well as multi-player participation in a “Party Style” deployment, the “Spin Game” concept is not only a unique crowd-pleaser, but a potential big “earner” as well.

(B) Dice Poker Variations—Since the game of “Dice Poker” is typically played with five six-sided dice, a total of 30 balls would be recommended for this variation—5 “ball sets”, with each individual ball marked with a value from one to six contained in each set—resulting in six ball “Types” (marked 1-6) with a quantity of five of each ball “Type”. Five dice values would typically be required for the game of “Dice Poker”, so a total of six Channels, each with a five ball capacity, would meet the game play requirements.

Alternately, and perhaps preferably, five Channels may be employed, thereby allowing 25 of the 30 balls to completely fill the capacity of all five Channels leaving an “overflow” of five balls remaining in the “Wheel Center” at the end of the round. This distribution method results in six “Dice Poker” “hands”—one hand for the five balls contained in each of the five Channels and one hand for the five “overflow” balls remaining in the “Wheel Center”.

Five Rings would also be created, each containing five balls. This would allow for five additional “Dice Poker” “hands” to be generated as well, resulting in a total of 11 available “hands” (five from the Channels, five from the Rings, and one from the “overflow” in the “Wheel Center”). A variety of wagering opportunities may be offered including but not limited to “low” pair, “high” pair, two pair, three-of-a-kind, a straight, a full house, four-of-a-kind, and/or five-of-a-kind, as well as comparative wagers in which the rank of a player selected “hand” is compared to the rank of another “hand” (typically the “overflow” balls in the “Wheel Center” representing the Dealer) in order to determine the success of the wager.

For example, with the “overflow” balls remaining in the “Wheel Center” serving as the Dealer’s hand, players may wager on whether the rank of a hand contained in a selected Channel or Ring hand will win, lose, or even tie against the rank of the Dealer’s hand.

Nontraditional wagers may include the combined “numerical” value of the numbered balls in a selected Channel or Ring being higher, lower, or exactly matching (tie) the combined “numerical” value of the numbered balls in another Channel, Ring, or most typically the “overflow” balls remaining in the “Wheel Center” (the Dealer), as well as the combined “numerical” value of the numbered balls in a selected Channel, Ring, or the “Wheel Center” being above or below a specific “numerical” value threshold or within or outside of a specific “numerical” value range.

For example, players may wager on whether the combined “numerical” value of the five numbered balls in a selected Channel or Ring will be more than, less than, or exactly the same as the combined “numerical” value of the five “overflow” numbered balls in the “Wheel Center” (the Dealer), or combined “numerical” value of the five numbered balls in a selected Channel, Ring, or the “Wheel Center” will be less than 17, more than 19, or exactly 17, 18 or 19. At the discretion of the casino, additional “numerical” value “range” wagers as well as specific and/or exact match “numerical” value wagers may also be offered. The wagering opportunities offered by the “Dice Poker” variation of the “Spin Game” are virtually limitless.

(C) Craps—Since the game of Craps is typically played with two six-sided dice, a total of 12 balls would be recommended for this variation—two “ball sets”, with each individual ball marked with a value from one to six contained in each set—resulting in six ball “Types” (marked 1-6) with a quantity of two of each ball “Type”. Two dice values are required for the game of Craps, so a total of six Channels, each with a two ball capacity, would meet the game play requirements. This would allow for six concurrent “throws” or “rolls” of the “dice” to be played simultaneously. Standard Craps wagers may be applied to each of the six Channels. This particular “Game Wheel” layout would also result in the creation of two Rings, each containing six balls. Additional Ring wagers may be offered as well, similar in nature to traditional Craps bets, however, taking into consideration that each Ring contains six “Dice Face” values rather than the traditional two.

Since many Craps wagers are dependent upon the “Point” value of a prior role, the game play and available methods of wagering would require some modifications. One approach would be to reduce the number of Channels from six to five, allowing 10 of the 12 balls to completely fill the capacity of all five Channels leaving an “overflow” of two balls remaining in the “Wheel Center” at the end of the round. The remaining balls "left over" in the "Wheel Center" may function as the "Come Out" roll or "Point" value.

Higher, lower, and matching value wagers may be offered for each Channel based upon the combined "numerical" value of the numbered balls in the selected Channel being higher, lower, or exactly matching (tie) the combined "numerical" value of the numbered balls remaining in the "Wheel Center". "Dice Face" value matching wagers may also be offered based on the "Dice Face" values of one or both of the numbered balls in a selected Channel matching those "Dice Face" values of the numbered balls remaining in the "Wheel Center". To avoid any potential confusion, it is recommended that combined "numerical" value wagers be displayed as a numeric value, while "Dice Face" matching wagers be displayed as graphic representations of the "Dice Face" values.

(D) Poker Variations—Since most poker games are played with a standard deck of 52 playing cards, a total of 52 balls would be recommended for this variation—one "ball set", with each individual ball marked with a corresponding card value of A, 2, 3, 4, 5, 6, 7, 8, 9, 10, J, Q, and K for each of the four "suits" (hearts, diamonds, clubs, and spades) contained in the set—resulting in 52 ball "Types" (marked A-K for each "suit") with a quantity of one of each ball "Type". Five card values would typically be required to produce a traditional poker "Hand", so a total of ten Channels, each with a five ball capacity, would meet the game play requirements. This arrangement would result in an "overflow" of two balls remaining in the "Wheel Center" at the end of the round.

By pairing the five card values in a selected Channel with the two "overflow" (Community) card values in the "Wheel Center", a seven-card hand can be produced from which the player may generate their highest ranking five card value hand—i.e. three card values from a selected Channel with both "overflow" Community card values, four card values from a selected Channel with one of the two "overflow" Community card values, or all five card values from a selected Channel with NO "overflow" Community card values. Players will be enticed and intrigued by the notion that all 52 card values are in play in the form of ten Channels each containing a five card value hand, and the "Wheel Center" containing two "overflow" Community card values common to all ten hands, thereby allowing players to make their best five card value hand from seven available card values.

This particular "Game Wheel" layout would also result in the creation of five Rings, each containing ten balls. Additional Ring wagers may be offered as well, similar in nature to traditional Poker bets, however, taking into consideration that each Ring contains ten card values rather than the traditional five. Such Ring wagering opportunities may include but are not limited to a straight, a flush, a full house, four-of-a-kind, a straight flush, and a royal flush. Given that each Ring contains ten cards, payout and/or bonus awards may be issued for straights, flushes, and straight flushes containing six or more card values that complete the requirement—i.e. six or more sequentially numbered card values, six or more card values of the same suit, or six or more sequentially numbered card values of the same suit—as well as for unique combinations such as a full house that includes four-of-a-kind (such as four-of-a-kind and a pair or four-of-a-kind and three-of-a-kind), double four-of-a-kind (i.e. four twos and four tens), etc. Progressive Jackpot participation may be offered on each Ring, allowing players to receive a percentage of or an entire jackpot in the event that the selected Ring contains an extremely rare, low probability outcome—i.e. a ten card straight, an eight, nine, or ten card straight flush, a double royal flush (i.e. two royals of different suits), etc.

Many popular types of Poker may be easily translated into "Spin Game" variations, including the time-honored Texas Hold'em. The entire standard deck of 52 card values may be distributed across the "Game Wheel" by employing 23 Channels-22 Channels with a two ball capacity and one Channel with a three ball capacity. This leaves five "overflow" balls remaining in the "Wheel Center" which may act as the Community card values. The 22 (two ball capacity) Channels allow for 21 concurrent, independent, simultaneous wagering opportunities should the $22^{nd}$ Channel be designated to represent an Opponent (the House) against which all the remaining card value hands compete to qualify for a win.

Similarly, the 22 (two ball capacity) Channels may be associated in 11 pairs of Channels, with one Channel representing the player and the other Channel representing the player's Opponent (in this case the House). The result is 11 concurrent, separate, simultaneous "Heads-Up" wagering opportunities in which the player's card value hand must outrank their corresponding Opponent's card value hand in the selected pair of Channels in order to qualify for a win.

Payout awards may be based upon the individual ranking of the player's winning hand or the ranking of the player's hand as it compares to the rank of their Opponent's losing hand. Barely edging out an Opponent on a well ranked hand may conceivably hold a greater intrinsic value—as it often does in actual Poker—than winning with a highly ranked hand over an Opponent with a poorly ranked hand or possibly even NO hand at all (i.e. just high card).

In the event of a tie—a "Chop Pot" in Poker terms, however in this particular example there is NO pot to split—(i.e. both player and opponent hold the same card values and the Community card values favor neither the player nor the Opponent, the best hand includes all of the Community card values, etc.), the player's wager is returned. An optional Tie wager may be offered for each pair of Channels resulting in a tie with the payout based upon the rank of the tied hand.

The single (three ball capacity) Channel contains the balls acting as the "Burn" card values which are normally discarded prior to the Flop, Turn, and River. These card values may be used for additional Proposition Wagers based on color (i.e. two or more cards red or black), suit (i.e. two or more cards of the same suit), numeric value (i.e. a pair or three-of-a-kind), numeric sequence, (i.e. three cards to a straight), and additive numeric card value total (i.e. additive numeric card values totaling 6-17, 20-26, and 27-33 if Aces have a numeric card value of 11, additive numeric card values totaling 3-14, 15-22, and 23-30 if Aces are have a numeric card value of one, etc.).

With only minor changes in game play, many different types of Poker are readily adaptable to the "Spin Game" platform. It is certainly not intended for the "Spin Game" Poker Variations to usurp the role of traditional forms of Poker—given that the very nature of Poker in general is a game of reading people while avoiding being read by others, knowing when and how much to bet, as well as when to fold. Rather, the "Spin Game" Poker Variations are designed to attract potential players that have an interest in game of Poker, but lack the experience and confidence to begin playing in live table games.

By offering individual standalone, as well as multi-player "Party Style" Poker Variations of the "Spin Game", novice players may begin to increase their exposure to Poker through a very nonthreatening gaming platform that allows them to place simple wagers and view the resulting outcomes, without having to worry about reading others, being read, and placing additional wagers throughout the course of the game. Players may instead concentrate on building their fundamentals of Poker knowledge and experience, which eventually become second nature to seasoned players.

In our example, players may witness the outcome of 11 "Heads-Up" hands each round of game play. Even in shorter play sessions, this can translate to literally hundreds of hands viewed, upon many of which the players have wagered. After players develop a comfort level playing the individual standalone Poker Variation of the "Spin Game", they may progress to the multi-player "Party Style" EGM and experience the same game in a slightly more competitive environment, where players may participate on opposing sides of a wager. When players become comfortable at this level of multi-player "Party Style" game play, it becomes a rather simple transition for them to apply their new found knowledge, experience, and comfort at the "tables"—a step they may have otherwise never taken without first testing the waters through "Spin Game" Poker Variations.

It is to the casino's significant advantage to begin offering games—typically in EGM format—that allow players to gain exposure, experience, and confidence with the concepts of the more popular and lucrative "table games" in a nonthreatening and non-intimidating fashion. Transitioning players from honing their conceptual knowledge and skills on an individual standalone game, to multi-player "Party Style" deployments where they may further bolster their confidence by competing directly against other players and finally arrive at the actual table game is easily facilitated with the "Spin Game" Poker Variations. This approach can contribute tremendously to Poker "table game" participation by evolving a new generation of players who might otherwise have never even considered playing at this level of interaction without first being able to develop their knowledge, skills, confidence, and comfort level through "Spin Game" Poker Variations.

(E) Other Card Games—Virtually any card game holds the potential to be adapted to the "Spin Game" platform. Certain games, such as Baccarat and Blackjack, require additional player input throughout the course of the game, which may include requesting an additional card (common to both games), or placing an additional wager (i.e. doubling down) or modifying how the hand is to be played, (i.e. splitting) which both occur in Blackjack. In such cases, minor modifications to the game play may be required for adaptation to the "Spin Game" platform.

For example, in Baccarat, only one decision is truly required of the player, and that is to place their wager on the Player, the Bank, or a Tie. Most casinos adhere to a standard "rule set" for dealing a third card to the Player and the Bank. Given the potential for two or three card hands, the "Spin Game" Baccarat adaptation may employ Channels with a three ball capacity in which the third ball is initially concealed or hidden from view. Based upon the Player's hand total from the first two balls, the "hidden" third ball in the Player's hand may then be revealed if the House "rule set" calls for the Player to receive another "card". Similarly, based upon the value of the Bank's hand, in addition to the card value of the Player's third ball (if used at all), the "hidden" third ball in the Bank's hand may then be revealed if the house "rule set" calls for the Bank to receive another "card".

In this example, pairs of Channels would be employed (one representing the Player and the other the Bank), with each Channel having a three ball capacity (regardless of whether the third ball in each Channel is used or not). In a single, standard 52 card deck adaptation, 16 Channels, each with a three ball capacity, may be associated in eight pairs of Channels, resulting in eight concurrent, separate, simultaneous Baccarat hands for players to wager upon during each round of game play. The four remaining balls "left over" in the "Wheel Center" at the end of the round may be used for additional wager and/or bonus or Progressive Jackpot opportunities based upon card value and suit distribution, such as by Poker hand ranking (i.e. two pair, three-of-a-kind, four to a straight, four to a flush, four-of-a-kind, four to a straight flush, or four to an ACE-high royal flush), etc.

Traditionally, Baccarat utilizes an eight-deck shoe holding 416 cards. If a multiple deck adaptation is desired, the "Spin Game" may be easily configured with three matching "ball sets"—resulting in 52 ball "Types" (marked A-K for each "suit") with a quantity of three of each ball "Type"—to represent a three deck game. In this three deck 156-card implementation, 52 Channels, each with a three ball capacity, may be associated in 26 pairs of Channels, resulting in 26 concurrent, separate, simultaneous Baccarat hands for players to wager upon during each round of game play with no balls remaining "left over" in the "Wheel Center". To simplify identification in this example, each pair of Channels may be labeled by a letter from A-Z, thereby better facilitating the wagering process and allowing ritualistic player to take advantage of favorite letters (i.e. players may prefer to wager on the letters in their name or a specific word). Theoretically, the "Spin Game" Baccarat adaptation may utilize any number of decks; however, given that multiple concurrent, separate, simultaneous Baccarat hands are playable each and every round, it is strongly suggested that the total quantity of available pairs of Channel for wagering be limited to a reasonable number to avoid potentially overwhelming players with too many choices.

Given that traditional Blackjack (as well as several other card based table games) involves even more interaction and decision making than Baccarat, detailing the specifics of a "Spin Game" adaptation would require the development of new, customized "rule sets" for games in which the "traditional rules" of game play vary significantly by location and venue. Given such considerations, Blackjack adaptations, as well as various other table game adaptations and/or variations, aren't fully detailed in this document and should in no way be regarded as limiting.

The purpose is to identify that virtually any table game, whether it is based on cards, dice, tiles, balls, etc., may be adapted to the "Spin Game" platform, allowing multiple hands, rolls, throws, games, etc. to be played both concurrently and simultaneously in roughly the same amount of time it would take for a traditional, single round of game play. The net results are more "hands played per minute", more wagering opportunities for players, a bridge for new players to begin experiencing table game play without fear or intimidation, and significantly improved returns to casino as each round of game play typically results in multiple wagers.

In fact, payback percentages may be adjustable in real-time based upon the quantity and value of concurrent wagers placed during a specific round of game play, thereby increasing the overall odds of winning and rate-of-return for players who make a larger number of higher value concurrent wagers—all while still maintaining a desired "House edge".

Further, the "Spin Game" offers a unique gaming platform which may be configured with a variety of wagering options that appeal to multiple spectrums of players—low hit frequency players who prefer fewer occurrences of low probability wining outcome events that result in significantly larger awards, as well as high hit frequency players who prefer numerous high probability winning outcome events that result in smaller awards. Players favoring low hit frequency wagers may play many rounds before experiencing a high value winning outcome event, while players favoring high hit frequency wagers may experience a significant number of small value wining events every round, more often than not, resulting in an award that is less than the total amount they wagered.

By deploying the “Spin Game” in both standalone single player and multi-player “Party Style” configurations, audience appeal is dynamically increased by catering to players who prefer an individual gaming experience as well as those who prefer “Party Style” games in which players can share winning events together as a group or take opposing sides of a wager.

In multi-player “Party Style” configurations, a method of player input may be employed in which the control of the input may be shared amongst the players, with input received from all participating players, or passed from player to player in similar fashion as the Dealer “button” is passed in Hold-em poker. Players receiving control of the input may make use of the input controls located at their wagering terminals or elect to allow the game to perform this function in a random manner. This feature may encourage players participating in “Party Style” deployments of the “Spin Game” to increase the duration of their play sessions in order to receive the opportunity to influence the game (albeit minimally) via the player input controls.

To ensure that a desired target number of games are played within a specified time frame, a countdown timer may be employed indicating the time remaining for all wagers to be placed. When the countdown timer reaches zero, “No More Bets” is called, and the “Game Wheel” is spun. This function is most appropriate for “Party Style” deployments of the “Spin Game” in which multiple players are placing wagers on the spin of a common “Game Wheel”, however, it may also be offered as an option on individual standalone gaming platforms as well.

(6) Game Themes consist of graphics, sound effects, animations, multi-media presentations and physical displays which may be applied to the “Game Wheel”, Channels, Rings, Ball “Types”, Betting Area, Status and Information Area, monitor display(s), and areas surrounding the game to attract players, maintain their interest, and provide a unique, fun-filled gaming experience.

The concept behind the “Spin Game” is quite basic; however, the implementation and methods of wagering can vary from relatively simple to extremely complex, depending upon the desired deployment. The result is an extremely “open” design format, in which simple mechanics—spinning the “Game Wheel”, watching where the balls land, and awarding winning combinations—allows for a nearly limitless library of Game Theme opportunities.

One of the simplest themes that may be applied to the “Spin Game” platform is the unique identification and/or naming of the individual Channels and/or Rings. From basic, incremental numbers or alphabetized letters, to specific words which may include names (i.e. the name of the game, the casino, a celebrity, etc.), and even individual components of nearly any type of “group”, opportunities for customized game themes abound. Naturally, the number of Channels and Rings available in the game will typically influence theme selection, however, the number of Channels and Rings in certain “Spin Game” deployments may be dictated in part or in whole by the desired theme.

For example, a “Spin Game” deployment with eight available Channels may identify the Channels numerically with numbers 1-8, alphabetically with letters A-H, or by the game name, which would ideally consist of eight characters. The trademarked name for a default, eight Channel “Spin Game” deployment is CAROUSEL™—resulting in the eight available Channels being labeled with the letters C, A, R, O, U, S, E, and L respectively. Appropriate graphics would reinforce the themed game name with complimentary, vivid imagery.

Added benefits to utilizing a game name include faster identification of Channels with reduced potential for player confusion, appeal to ritualistic players who may prefer to wager upon Channels labeled with certain favored letter combinations (i.e. C-A-R, R-O-S-E, S-O-U-L, etc.), and the ability to offer wagers based upon vowels and consonants appearing in the name (typically for names with an equal number of vowels and consonants, however, payout odds may be adjusted accordingly for vowel or consonant “rich” game names).

Rings may be similarly identified numerically or alphabetically, although it is strongly suggested that Channels and Rings utilize different means of identification to avoid any potential confusion (i.e. when Channels are identified numerically, Rings should be identified alphabetically, or by using a different numerical format such as Roman Numerals). Rings may also be identified by names and, depending upon the Game Theme, Ring names should compliment the names applied to the Channels in some way.

In the CAROUSEL™ example, potential Ring names may include the various breeds of horses and/or the names of animals that typically appear on a carousel. Given the significance of “grabbing the Brass Ring” when riding carousels, the names of various types of rings (i.e. Pearl, Emerald, Sapphire, Diamond, etc.) may also be utilized. Once again, the choices are virtually limitless—whatever the “grouping”, it can be applied to the “Spin Game” and themed appropriately.

Similarly, the trademarked name for a default, ten Channel “Spin Game” deployment is REVOLUTION™—resulting in the ten available Channels being labeled with the letters R, E, V, O, L, U, T, I, O, and N respectively. Consisting of five vowels and five consonants, the ten Channel REVOLUTION™ “Spin Game” deployment is also open to offering vowel and consonant specific wagers. Given that the letter “O” appears twice in the name, alternative naming variations are available in order to offer ten “unique” Channel name Identifiers. These may include but are not limited to the trademarked game names REVØLUTION™, REV$\overline{\text{O}}$LUTION™, and REV-[OH!]-LUTIONT™ in which the first instance of the letter “O” has been replaced with “Ø” (a zero with a slash), “$\overline{\text{O}}$” (the letter O with a macron bar), and “OH!” (the word Oh!) in each name respectively.

Continuing, the trademarked name for a default, 12 Channel “Spin Game” deployment is CENTRIFUSION™—resulting in the 12 available Channels being labeled with the letters C, E, N, T, R, I, F, U, S, I, O, and N respectively. Alternate variations of the trademarked name include but are not limited to CENTRAFUSION™—resulting in the 12 available Channels being labeled with the letters C, E, N, T, R, A, F, U, S, I, O, and N respectively. All five vowels (A, E, I, O, and U) appear in this alternate name variation, allowing for additional wagering opportunities as well as a greater variety of favored letter combinations that appeal to ritualistic players. In addition to names, nearly any specified group of component elements may also be used as a “Spin Game” theme.

For example, a 12 Channel “Spin Game” deployment may be themed by a common, recognizable group of 12 components, such as the calendar. Months (January, February, March, April, May, June, July, August, September, October, November, and December), may be used to uniquely identify each of the 12 Channels. Seasons (Winter, Spring, Summer, and Fall) may be used to identify Multiple Channel wagers (each consisting of three Channels corresponding to the months of each Season) and/or serve as Ring names to identify four available Rings.

Astrological Signs such as those in the Western Zodiac (Aires, Taurus, Gemini, Cancer, Leo, Virgo, Libra, Scorpio, Sagittarius, Capricorn, Aquarius, and Pisces) may also serve as Channel name Identifiers. Associated "Elements" (Fire, Earth, Air, and Water) and "Qualities" (Cardinal, Fixed, and Mutable) may be used to identify Multiple Channel wagers (each consisting of three Channels corresponding to their associated "Element" or four Channels corresponding to their associated "Quality") and/or serve as Ring names to identify four available Rings by "Element" or three available Rings by "Quality".

Similarly, Astrological Signs such as those in the Eastern Zodiac (Rat, Ox, Tiger, Rabbit, Dragon, Snake, Horse, Sheep, Monkey, Rooster, Dog, and Pig) may also serve as Channel name Identifiers. Associated "Elements" (Fire, Water, Wood, and Metal) and "Seasons" (Winter, Spring, Summer, and Autumn) may be used to identify Multiple Channel wagers (each consisting of three Channels corresponding to their associated "Element" or "Season") and/or serve as Ring names to identify the four available Rings by "Element" or "Season". In certain deployments based upon the Eastern Zodiac, Yin/Yang wagers may be offered, however, it should be noted that since half of the Channels are "Yin" and the other half are "Yang", some balls should remain "left over" in the "Wheel Center" at the end of the round to adjust the odds to slightly favor the House accordingly.

Channels may also be identified by images, Logos, etc. common to a selected Game Theme. For example, an NFL themed "Spin Game" deployment may feature teams in the AFC and/or the NFC. Given that both the AFC and NFC each have sixteen teams, a sixteen Channel "Spin Game" deployment featuring the Logos of each team in a particular Conference as Channel Identifiers may be used. "Regions" (North, South, East, and West) may be used to identify Multiple Channel, "Segment" and/or "Series" wagers, each consisting of four Channels corresponding to the teams belonging to each specific "Region" in a particular Conference. "Regions" as well as "Quarters and/or Downs" (First, Second, Third, and Fourth) may also serve as Ring names to identify four available Rings. Eight Channel "Spin Game" deployments may include teams belonging to two Regions (i.e. AFC North and AFC South, or AFC North and NFC North), taking advantage of particularly fierce rivalries between teams to encourage wagering opportunities among players who are loyal fans. A 32 Channel "Spin Game" deployment may incorporate all teams in both Conferences and include wagering opportunities structured to allow players to select a Channel (Team) that they believe will outperform (contain a higher value than) one or more other Channels (Teams) they've also selected.

For example, a player may wager that the Minnesota Vikings (Channel Identifier) will beat the Green Bay Packers (Channel Identifier). For such a wager to result in success, the value associated with the Vikings' Channel must exceed the value associated with the Packers' Channel. Similarly, a player may wager that the Philadelphia Eagles (Channel Identifier) will beat both the Dallas Cowboys and the New York Giants (Channel Identifiers), resulting in a Single versus Multiple Channel wager. For such a wager to result in success, the value associated with the Eagles' Channel must exceed the value associated with the Cowboys' Channel as well as the value associated with the Giants' Channel.

Ball "Types" employed in this deployment may include numerical values, symbols, and/or common football terms (i.e. Touchdown, Field Goal, Safety, Touchback, Interception, Fumble, Quarterback Sack, Penalty Flag, etc.). Values such as tackles, yardage, points scored, etc. are assigned to each ball "Type" in order to produce a calculable total for each Channel. Channel values for each wager are compared, and successful wagers are awarded payouts and/or bonuses for meeting and/or exceeding the specified requirements of the wager.

In a similar fashion, Major League Baseball may also serve as a Game Theme with 14 team Logos serving as Channel Identifiers for the American League and 16 team Logos serving as Channel Identifiers for the National League. A 30 Channel "Spin Game" deployment may incorporate all teams in both Leagues and include wagering opportunities structured to allow players to select a Channel (Team) that they believe will outperform (contain a higher value than) one or more other Channels (Teams) they've also selected.

Ball "Types" employed in this deployment may include numerical values, symbols, and/or common baseball terms (i.e. Single, Double, Triple, Home Run, Grand Slam, Out, Double Play, Error, etc.). Values such as balls, strikes, runs, hits, etc. are assigned to each ball "Type" in order to produce a calculable total for each Channel. Channel values for each wager are compared, and successful wagers are awarded payouts and/or bonuses for meeting and/or exceeding the specified requirements of the wager.

The NBA presents yet another opportunity with two Conferences (Eastern and Western) and 30 teams divided into six Divisions (Atlantic, Central, and Southeast for the Eastern Conference and Southwest, Northwest, and Pacific for the Western Conference). Since both Conferences each have 15 teams in three Divisions, a "Game Wheel" with 15 team Logos serving as Channel Identifiers would meet the requirements of either Conference, and a 30 Channel "Spin Game" deployment may incorporate all teams in both Conferences and include wagering opportunities structured to allow players to select a Channel (Team) that they believe will outperform (contain a higher value than) one or more other Channels (Teams) they've also selected. Given that each Division contains five teams, Multiple Channel wagering opportunities may also be offered, including those allowing players to select a "Segment" and/or "Series" of Channels (i.e. five teams belonging to a particular Division) that they believe will outperform (contain a higher total value than) one or more other "Segments" and/or "Series" of Channels (Divisions—i.e. Atlantic versus Central and/or Southeast).

Ball "Types" employed in this deployment may include numerical values, symbols, and/or common basketball terms (i.e. Steal, Layup, Free Throw, Slam Dunk, Hook Shot, 3-Point Shot, Personal, Technical, Traveling, etc.). Values such as baskets, rebounds, assists, etc. are assigned to each ball "Type" in order to produce a calculable total for each Channel. Channel values for each wager are compared, and successful wagers are awarded payouts and/or bonuses for meeting and/or exceeding the specified requirements of the wager.

Similarly, the NHL also sports two Conferences (Eastern and Western) with 30 teams divided into six Divisions (Atlantic, Northeast, and Southeast for the Eastern Conference and Central, Northwest, and Pacific for the Western Conference). Just as with the NBA Game Theme example, since both Conferences each have 15 teams in three Divisions, a "Game Wheel" with 15 team Logos serving as Channel Identifiers would meet the requirements of either Conference, and a 30 Channel "Spin Game" deployment may incorporate all teams in both Conferences and include wagering opportunities structured to allow players to select a Channel (Team) that they believe will outperform (contain a higher value than) one or more other Channels (Teams) they've also selected. Similarly, given that each Division contains five teams, Multiple Channel wagering opportunities may also be offered, including those allowing players to select a "Segment" and/or "Series" of Channels (i.e. five teams belonging to a particular Division) that they believe will outperform (contain a higher total value than) one or more other "Segments" and/or "Series" of Channels (Divisions—i.e. Pacific versus Central and/or Northwest).

Ball "Types" employed in this deployment may include numerical values, symbols, and/or common hockey terms (i.e. Breakaway, Deke, Power Play, Slap Shot, Face-off, Body Check, Icing, Penalty Box, etc.). Values such as goals, assists, hat tricks, etc. are assigned to each ball "Type" in order to produce a calculable total for each Channel. Channel values for each wager are compared, and successful wagers are awarded payouts and/or bonuses for meeting and/or exceeding the specified requirements of the wager.

Even Major League Soccer holds the potential for becoming a Game Theme with two Conferences (Eastern and Western), each currently with eight clubs. Since both Conferences each have eight clubs, a "Game Wheel" with eight club Logos serving as Channel Identifiers would meet the requirements of either Conference, and a 16 Channel "Spin Game" deployment may incorporate all clubs in both Conferences and include wagering opportunities structured to allow players to select a Channel (Club) that they believe will outperform (contain a higher value than) one or more other Channels (Clubs) they've also selected.

Whatever the recreation, an excellent opportunity for a themed version of the "Spin Game" awaits to capitalize on the loyal fan-base seeking wagering entertainment opportunities centered on their favorite sports, teams, and players.

Other group-based activities, events, etc. may also easily be adapted to Game Themes for the "Spin Game" platform. NASCAR racing is one such example of a highly competitive event that includes individual drivers, racing teams, sponsors, and specific models of vehicles from various automobile manufacturers. Since the "Spin Game" may be deployed in a completely electronic format, updates to the software can be easily made, thereby allowing the game to feature the most popular drivers and racing teams, as well as capitalize on rivalries and media attention throughout the racing season.

Driver images, names and/or vehicle numbers may be used as Channel Identifiers. Vehicle Manufacturers (i.e. Chevrolet, Dodge, Ford, and Toyota) may be used as Ring names to identify four available Rings. Sponsor Names and/or Logos (typically Primary Sponsors) may also be used as Channel Identifiers, or alternately, to identify an individual "Socket" within a selected Channel on a specified Ring. In other words, if drivers are used as Channel Identifiers, and vehicle Manufacturers serve as Ring Names, a driver's Primary Sponsor may be displayed within their Channel on the Ring corresponding to the Manufacturer of the vehicle they're driving.

For example, Hendrick Motorsports' teammate Jimmie Johnson drives a Chevrolet Impala (#48) and has Lowes as one of his Primary Sponsors. A specific Channel may be identified by driver image, name, and/or vehicle number—in this case, an image of Jimmie Johnson (#48)—and contain four ball "Sockets", one for each Ring representing each vehicle Manufacturer (in this case, Chevrolet, Dodge, Ford, and Toyota). The ball "Socket" within Jimmie Johnson's (#48) Channel on the Chevrolet Ring may contain the Lowes Logo.

Wagering opportunities may be offered in which a specific ball "Type" must occupy an exact "Socket" position. This would be considered a combined Channel/Ring (or "Socket") specific wager, in which a single, specified ball "Socket" must be filled with a selected ball "Type". These wagering opportunities may be further extended to require all drivers on a team to fill their Primary Sponsor "Socket" position in their respective Channels with a selected ball "Type". Depending upon the "Spin Game" variation, winning such extremely low probability outcome wagers may result in the award of a consumer version of the same vehicle driven by one of the Team members. Opportunities for cooperative advertising and prize sponsorships abound in such deployments.

Ball "Types" employed in this deployment may include numerical values, symbols, and/or common racing terms such as Laps, Pole Position, Pit Stop, Bump, Crash, Yellow Flag, Green Flag, White Flag, Checkered Flag, etc. Values such as laps, miles per hour, pit times, etc., are assigned to each ball "Type" in order to produce a calculable total for each Channel. Channel values for each wager are compared, and successful wagers are awarded payouts and/or bonuses for meeting and/or exceeding the specified requirements of the wager.

Certain demographics of players may prefer their gaming experience to be whimsical and/or kitschy. This notion is often revealed in the form of nontraditional EGMs designed primarily for the Asian markets. The "Spin Game" can easily be adapted to cater to this preference. Further, the "Spin Game" may be readily updated to a new Game Theme or completely different deployment with only minor changes in software and signage, thereby maintaining it at the forefront of hot trends for new and unique gaming opportunities.

For example, food is an ever popular Game Theme which can easily be adapted to the "Spin Game" platform. Dishes from around the world, including specialties based upon locale and/or ethnic background—as well as signature menu items from featured dining venues—may serve as Channel Identifiers and/or ball "Types" in a food themed adaptation of the "Spin Game".

One such "Spin Game" deployment for a Sushi themed game may feature vivid images of Sushi rolls (i.e. Makizushi, Futomaki, Hosomaki, Temaki, Uramaki, etc.), as well as various forms of Nigiri and Sashimi. These menu items may be used as ball "Types" with images of hungry customers serving as Channel Identifiers. Drawing upon the rich culture of Japan, popular stars including athletes, sumo wrestlers, musicians, artists, actors, personalities, etc., and even "Anime" (Animated and/or "Manga") character images may serve as Channel Identifiers (hungry customers). Wagers may be placed on the number and variety of different pieces of Sushi that players believe will be "eaten" (or otherwise "consumed") by one or more of the hungry customers (the quantity of each "Type" of ball landing in one or more specified Channels).

With practically limitless variations, the "Spin Game" may be easily themed to appeal to most any audience. Solid, hyper-geometric distribution math (the same used by nearly all State lotteries) ensures that the House will always maintain a desired edge. Customizable rates of game play speed, coupled with optional countdown timers, virtually guarantee that "hands per minute" target goal requirements are met or exceeded. Players are presented with multiple wagering opportunities during each game, resulting in more potential winning opportunities per game for the player and significantly higher returns per game played for the casino. Deployments include individual standalone as well as multi-player "Party Style" variations, allowing players to enjoy both a personal, private, individualized gaming experience, as well as a shared group dynamic typically only experienced in table-based games—allowing players to wager with or against other players on a multitude of possible outcomes.

The central focus of the "Spin Game" is the "Game Wheel", consisting of a "Wheel Center" and a number of Channels distributed along its outer edge. Each Channel has a given depth or ball capacity, and the same position within each Channel collectively form Rings. An individual position within a specific Channel on a specific Ring is considered a "Socket" (or Channel/Ring position). Fill order is from the bottom of each Channel to the top—the outermost Ring and "Socket" position to the innermost.

The "Game Balls" are labeled and/or otherwise marked in a particular "Style" such as by color, number, graphic representations, etc. and a variety of ball "Types" (such as red, white, blue, green, and gold for a color "Style") are placed at rest in the "Wheel Center". Values are associated with the quantity and distribution of each ball "Type" which are reflected in the odds displayed in the Betting Area.

The purpose of the Channels and Rings is to collect the "Game Balls" when the "Game Wheel" is spun and the balls are forced from their resting place in the "Wheel Center", outwards towards the awaiting Channels and Rings. Players utilize the Betting Area to place wagers on how they believe the "Game Balls" will fill the various Channels and Rings as well as which balls (if the number of balls in play exceeds the capacity of all the Channels) will remain "left over" in the "Wheel Center" at the end of the round of game play. The Betting Area provides a comprehensive view of the available wagers, their respective odds and payouts, and an easy-to-use interface for players to place their wagers.

The Status and Information Area displays the wagers that players have placed for the upcoming round of game play and allows players to quickly and easily repeat, modify, remove and/or delete wagers placed during the prior round of game play. During the course of game play, when the "Game Wheel" is spinning and the balls are filling the Channels and Rings, the Status and Information Area is updated in real-time, displaying the level of fulfillment of each wager. Additional information displayed may include but is not limited to total credits wagered, total credits won, associated odds, winning wagers not placed by the player (i.e. missed opportunities the player may choose to wager upon in the future), the quantity and "Type" of each ball filling the Channels and Rings upon which the player has wagered, etc.

The Game Variation dictates the layout of the "Game Wheel" including the number and capacity of the Channels and Rings, the "Style" of balls and quantity of each ball "Type", and the available wagers in the Betting Area. Game Variations allow the concept behind the "Spin Game" to be expanded to a variety of unique deployments, most notably including adaptations of popular table games that normally utilize cards, dice, tiles, balls, etc. These Game Variations allow players to experience table game play in a new and unique manner, allowing for multiple traditional rounds of game play to be executed concurrently and simultaneously in a single round of "Spin Game" play. Further, players who typically avoid table games, often relegating themselves to only playing EGMs due to the fear and intimidation associated with having to learn how to play a table game, can gain tremendous experience in a short period of time by playing a "Spin Game" adaptation of the same table game. "Spin Game" variations are an excellent means of transitioning players to table games while also appealing to players who enjoy having a multitude of wagering opportunities available—including multiple concurrent, simultaneous outcomes—all occurring within a single round of play.

The Game Theme compliments the "Spin Game" and may best be thought of as a "skin" or dressing that appeals to players and encourages them to investigate, try, and eventually become an avid player. Game Theme opportunities are practically limitless, and given the ease of configuration of the "Spin Game", Game Themes may be changed frequently and regularly to maintain player interest by taking advantage of popular trends.

The "Spin Game" is a highly adaptable gaming platform that can easily be configured in a multitude of variations. Beyond the default implementation, diverse deployments of the "Spin Game" may include but are not limited to adaptations and variations of existing table games. Further, by employing Game Themes, the "Spin Game" may easily be deployed with nearly limitless configurations, opening the doors to capitalize upon prevailing trends, popular culture icons, etc. Given that both Game Variations and Game Themes are core elements of the structure of the "Spin Game", they are described in greater detail as integral components within this document in Sections (5) Game Variations, and (6) Game Themes.

Example Game Basic Play Logic:

[1.] The player inserts coins, cash, or a ticket into the EGM and receives credits corresponding to the posted value per credit displayed on the EGM.

[2.] The player is presented with the Betting Area and Status and Information Area onscreen displays and prompted to select their desired wagers and indicate the credits they wish to place on each specific wager. In the event that an optional count-down timer is engaged (typically used in "Party Style" deployments), the player is informed that all wagers for the next round of game play must be placed before the count-down timer reaches zero. If the count-down timer has already reached zero and/or the balls are in the process of being distributed into the Channels and Rings, the player is notified that any wagers placed will become active during the next round of game play.

[3.] In standalone configurations, when the player has finished placing their desired wagers, they are prompted to "Spin the Wheel". In deployments featuring user input devices including but not limited to joysticks, wheels, levers, knobs, buttons, etc. that allow the player to contribute in a small degree to the random distribution of "Game Balls" within the "Game Wheel", the user is given the opportunity to utilize such controls to set the "Game Wheel" in motion, select and/or change the direction of rotation, slow down or speed up the speed of rotation, etc. or simply allow the "Game Wheel" to spin at its default setting. "Party Style" deployments may also make use of this feature by allowing all participating players to contribute their input to the "Game Wheel" together, or passing the privilege from player to player in a similar fashion as the "Dealer button" is passed in poker.

[4.] As the "Game Wheel" spins and the balls begin to fill the available Channels and Rings, the Status and Information Area is updated in real-time to display the level of fulfillment for each of the wagers the player has placed. Additionally, other common wagers (generally those listed in the Betting Area) may be updated as well, even if the player has not wagered on them, thereby showing the player the results of potential "missed opportunity" wagers which the player may choose to later add to their "Wager List" in upcoming rounds of game play.

[5.] Depending upon the deployment, when the Channels and Rings have been filled to capacity or when all balls have been distributed into the Channels and Rings from the "Wheel Center", the "Game Wheel" is stopped and the Status and Information Area is updated to display the results of the round of game play, including but not limited to the total credits the player has wagered, the total credits the player has won, wagering opportunities resulting in success that the player neglected to select but may easily choose for the next round of game play, etc.

[6.] In the event that a wager placed by the player results in success and the award is a Bonus Round, the onscreen displays for the "Game Wheel", the Betting Area, and the Status and Information Area are updated to reflect the Bonus Round layout and Bonus Round wagers. The player is instructed to make their Bonus Round selections and spin the Bonus Round "Game Wheel". In "Party Style" deployments, only players who have won a wager resulting in the award of a Bonus Round will have their displays updated to make their Bonus Round selections, while the remaining players may continue to place and modify their wagers for the upcoming round of normal game play after the Bonus Round. Once again, an optional count-down timer may be employed to ensure timely execution of the Bonus Round. Should a player fail to make their Bonus Round selections in a punctual manner, the "Spin Game" may randomly make Bonus Round selections on behalf of the player, assign the same Bonus Round selections placed by a randomly selected player, or simply award the lowest prize amount awarded in the Bonus Round.

[7.] Upon completion of the Bonus Round, the Status and Information Area is updated to reflect the total credits awarded during the Bonus Round. Afterwards, players who participated in the Bonus Round are returned to the normal "Spin Game" display layout where they may place new wagers, as well as repeat, modify, remove, and/or delete prior wagers.

[8.] Players may continue playing rounds of the "Spin Game" in this manner until such time as they exhaust their supply of credits (at which point they may add additional credits or leave the game for a new player to take their place) or elect to cash out.

As to a further discussion of the manner of usage and operation of the present invention, the same should be apparent from the above description. Accordingly, no further discussion relating to the manner of usage and operation will be provided.

An underlying basis for the present technology may be further appreciated by a review of concepts that can be understood from a further review of FIG. 1. Each of the channels C-A-R-O-U-S-E-L (or any other distinct numbers of channels, from at least three to ten or more) may be considered as payline-type functions, or a column or row in the distribution of symbols for determination of winning events in paylines (as in slot play), totalizing collected symbols (as in keno), identifying distinct hands (as in playing card games) and as other functional subcomponents in wagering games. The "balls" may also be deployed randomly within each of the rings, moving sideways out of the channels into available retention spaces or acceptance spaces in the rings, as denoted by "Ring", "A," "Ring" and 'B," for example. These positions may be further denoted as column (1-12_ and the further identifiers of "Ring" or "A," "B," "C" or "D."

The collection of game elements, shown in the figures as balls (or they may be other geometric shapes, such as ovals, stars, triangles, squares, rectangles) or figures (e.g., animals, characters, cars, rockets, dice, dominoes, etc.) may be randomly selected out of the central grouping (or provided to the central area one-at-a-time) to be distributed to respective channels in a random manner. The game elements may be both randomly selected or randomly provided from the group (one-at-a-time or multiple game elements at a time) and/or randomly provided with access to randomly selected individual channels one-at-a-time or multiple game elements at a time. These random selections may be effected by physical random selection or pseudo-random selection by a random number generator in an electronic format system. In any of these various functionalities, random game elements are provided into the channels and placed into a readable distribution (e.g., linearly in the channels, in rows or in columns, or in any other predetermined distribution), after distribution of the game elements into and/or through the channels, and after a predetermined number of game elements have been finally completely. The processor (or in a physical game the dealer or house) shall read from the final distribution of game elements winning and losing combinations of game elements according to otherwise relatively common rules of paylines, pay events, bonuses and outcomes. For example, poker hands may be read from randomly provided playing cards, domino combinations may be read from randomly distributed domino-like game elements, dice elements may be read according to Yahtzee™ game rules, color combinations of balls in channels may be read, numbers provided on the symbols may be read in keno type games, etc.

The game elements (which will be referred to as "balls" for purposes of convenience, even though other elements may be used) may be initially shown as a grouping of balls, as in FIG. 1, or may be stored as a virtual set of predetermined images of balls that are provided one-at-a-time. The balls may appear as a static collection or as a randomly redistributing, intermixing pattern of balls, giving a greater appearance of randomness. The balls may be provided out of the total set of balls, (which may or may not also be replenished or partially replenished as balls are removed) into the channels, where they may be aligned within the circular rings (which may or may not act as rows on the system.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A gaming system comprising:

a) a processor;

b) a video display monitor; and c) player input controls comprising at least player wager entry control for placing a wager on a wagering game on the gaming system;

wherein the processor contains both game rules and payment rules for winning and losing outcomes according to the game rules;

wherein the processor is in communication with a random number generator;

the random number generator randomly selecting game elements from a first set of game elements having at least two different identifying characteristics that can be used according to the game rules;

the processor providing image data to the video display monitor to display provision of the randomly selected game elements from a central location into a radial distribution of rings or channels for placement in a display mode for determining winning outcomes.

2. The gaming system of claim 1 wherein all available game elements are provided by the processor for display on the display screen at the same time.

3. The gaming system of claim 2 wherein all available gaming elements are provided in the central area of a displayed radial distribution of channels and where the processor provides image data of individual game elements moving into channels.

4. A process for playing a wagering game on the gaming system of claim 1 wherein a predetermined number of gaming elements are distributed through the channels into a display mode and then the processor further displays winning and losing outcomes.

5. The process of claim 4 wherein the display of winning outcomes includes showing on the display screen an amount of award provided on an underlying wager.

6. The gaming system of claim 1 wherein the processor is configured to evaluate a distribution of symbols provided by the random number generator and displayed on the video display monitor and the processor is configured to resolve wagers on the wagering game.

7. The gaming system of claim 1 wherein the processor is configured so that wagering game is an underlying wagering game on the gaming system on which at least some winning resolutions are based on first outcomes displayed on the video display monitor and at least some winning outcomes on wagers are provided in proportion to the wagers.

8. The gaming system of claim 1 wherein the processor is configured so that wagering game comprises a bonus event that is triggered in an underlying wagering game on the gaming system on which at least some winning resolutions in the bonus event are based on second outcomes displayed on the video display monitor and at least some winning outcomes in the bonus event wagers are provided in proportion to the wagers on the underlying game.

9. The gaming system of claim 1 wherein the processor is configured so that wagering game comprises a bonus event that is triggered in an underlying wagering game on the gaming system on which at least some winning resolutions in the bonus event are based on second outcomes displayed on the video display monitor and at least some winning outcomes in the bonus event wagers are provided as jackpot amounts that are not in proportion to the wagers on the underlying game.

10. The gaming system of claim 7 wherein identifiers are placed on channels or rings and winning outcomes are based upon achievement of at least one predetermined distribution of virtual game elements within the channels or rings.

11. The gaming system of claim 8 wherein identifiers are placed on channels or rings and winning outcomes are based upon achievement of at least one predetermined distribution of virtual game elements within the channels or rings.

12. The gaming system of claim 9 wherein identifiers are placed on channels or rings and winning outcomes are based upon achievement of at least one predetermined distribution of virtual game elements within the channels or rings.

13. The gaming system of claim 12 wherein the winning outcomes are based upon side best, proposition wagers or progressive jackpot wagers.

* * * * *